(12) United States Patent
Feeney et al.

(10) Patent No.: US 6,233,351 B1
(45) Date of Patent: *May 15, 2001

(54) METHOD AND APPARATUS FOR PROCESSING A FREEHAND SKETCH

(75) Inventors: Mark A. Feeney, Palmdale; Edward T. Corn, Agua Dulce, both of CA (US)

(73) Assignee: Dassault Systemes of America Corp., Burbank, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,051

(22) Filed: Oct. 8, 1997

Related U.S. Application Data

(63) Continuation of application No. 08/659,543, filed on Jun. 6, 1996, now abandoned, which is a continuation of application No. 08/289,608, filed on Aug. 12, 1994, now abandoned.

(51) Int. Cl.$^7$ ...................................................... G06K 9/62
(52) U.S. Cl. ............................................ 382/155; 345/522
(58) Field of Search ................................... 382/100, 203, 382/155, 156, 159, 173, 187; 364/488–491, 512; 345/425–443, 501, 964, 474.24, 433–440, 522, 442; 33/11, 18.1, 18.2–21.2, 21.1, 19.3, 20.3, 20.4; 707/502, 500; 706/15, 20

(56) References Cited

U.S. PATENT DOCUMENTS 4,785,399 * 11/1988 Evans et al. ......................... 395/156
4,821,214 * 4/1989 Sederberg ............................ 395/120

(List continued on next page.)

OTHER PUBLICATIONS

Saga, "A Freehand Interface for Computer Aided Drawing Systems Based on the Fuzzy Spline Curve Identifier", IEEE 1995, pp. 2754–2759.*

(List continued on next page.)

Primary Examiner—Jay Patel
(74) Attorney, Agent, or Firm—Blakely, Sokoloff, Taylor & Zafman LLP

(57) ABSTRACT

A computerized method of drawing provides sketching-type drawing capabilities in a computer-aided design (CAD) environment. Geometrical drawing parts or elements, sketched through a hand-controlled indicator and lacking in the precision criteria or standards associated with formal drawings, are recognized and interpreted as points, straight lines, open arcs, circles and ellipses. Delete and "areafill" symbols, similarly, are recognized and interpreted. The method also provides the capability to distinguish and interpret relatively complex, multiple-part or element strokes. This is done by determining break locations for the elements along the stroke, and by recognizing these elements before re-constituting a stroke meeting precision criteria. A variety of geometrical constraints which are important in a CAD environment, including coincidence, parallelism, tangency and relimitation, are also recognized and imposed. The recognizing of geometrical elements includes the use of pattern recognition and the use of a neural net. The determination of breaks incorporates the calculation of functions representative of changes in angle, of curvature, and of changes in slope, and the classification of information elements representative of locations, based on such calculations.

21 Claims, 10 Drawing Sheets

U.S. PATENT DOCUMENTS

| | | | |
|---|---|---|---|
| 4,845,643 | | 7/1989 | Clapp ................................... 364/518 |
| 4,855,939 | | 8/1989 | Fitzgerald, Jr. et al. ............ 364/522 |
| 4,933,865 | * | 6/1990 | Yamamoto et al. .................. 382/203 |
| 4,987,554 | * | 1/1991 | Kaufman ............................... 395/124 |
| 5,010,502 | | 4/1991 | Diebel et al. ........................ 364/522 |
| 5,123,087 | | 6/1992 | Newell et al. ....................... 395/155 |
| 5,138,697 | * | 8/1992 | Yamamoto et al. .................. 395/120 |
| 5,198,990 | * | 3/1993 | Farzan et al. ........................ 364/560 |
| 5,251,268 | * | 10/1993 | Colley et al. ........................ 382/159 |
| 5,297,241 | | 3/1994 | Hirr, Jr. et al. ...................... 395/127 |
| 5,299,307 | | 3/1994 | Young ................................... 395/161 |
| 5,353,395 | | 10/1994 | Tokumasu et al. ................... 395/141 |
| 5,371,845 | * | 12/1994 | Newell et al. ....................... 345/347 |
| 5,377,313 | * | 12/1994 | Scheibl ................................. 395/122 |
| 5,390,294 | | 2/1995 | Takeuchi ............................... 395/155 |
| 5,396,565 | * | 3/1995 | Asogawa ............................... 382/159 |
| 5,410,496 | * | 4/1995 | Bolon et al. .......................... 364/578 |
| 5,412,762 | * | 5/1995 | Kondo ................................... 395/120 |
| 5,425,109 | * | 6/1995 | Saga et al. ............................ 382/159 |
| 5,452,238 | * | 9/1995 | Kramer et al. .................. 395/500.01 |
| 5,461,709 | | 10/1995 | Brown ................................... 395/155 |
| 5,463,722 | | 10/1995 | Venolia ................................. 395/133 |
| 5,465,324 | | 11/1995 | Lee et al. .............................. 395/133 |
| 5,490,241 | | 2/1996 | Mallgren et al. .................... 395/140 |
| 5,537,519 | * | 7/1996 | Vossler et al. ....................... 395/120 |
| 5,861,889 | * | 1/1999 | Wallace et al. ...................... 345/433 |

OTHER PUBLICATIONS

*Newton Tips & Technology*, Apple Computer, Inc., 1993.
*Newton MessagePad 100 Setup and Handwriting Guide*, Apple Computer, Inc., 1994.
*Newton MessagePad Handbook.*
Declaration of Christopher C. Romes, executed Jul. 26, 1994.
H. Samet; "The Design and Analysis of Spatial Data Structures" Addison–Wesley Publishing Company, Inc., pp 1–151.
Declaration of Christopher C. Romes, executed Jul. 26, 1995.
kanai, et al., "Generation of Free–Form Surface Modeles by Understanding Geometric and Topological Constraints on Rough Sketches," Systems Engineering, 1992 International.
Luzadder W., "Fundamentals of Engineering Drawing", pp. 85–86, 1981.
C. Clarke, "Bravo New World– Schlumberger AG's CAD–CAM System", CADCAM, vol. 11, pp. 17(3), 11/92.
D. Schwartz, "Modeling Made Easy: HP's ME30 Software Allows Leviton Manufacturing to get Over the Hump", HP Professional, vol. 8, pp. 24(2), 4/94.

\* cited by examiner

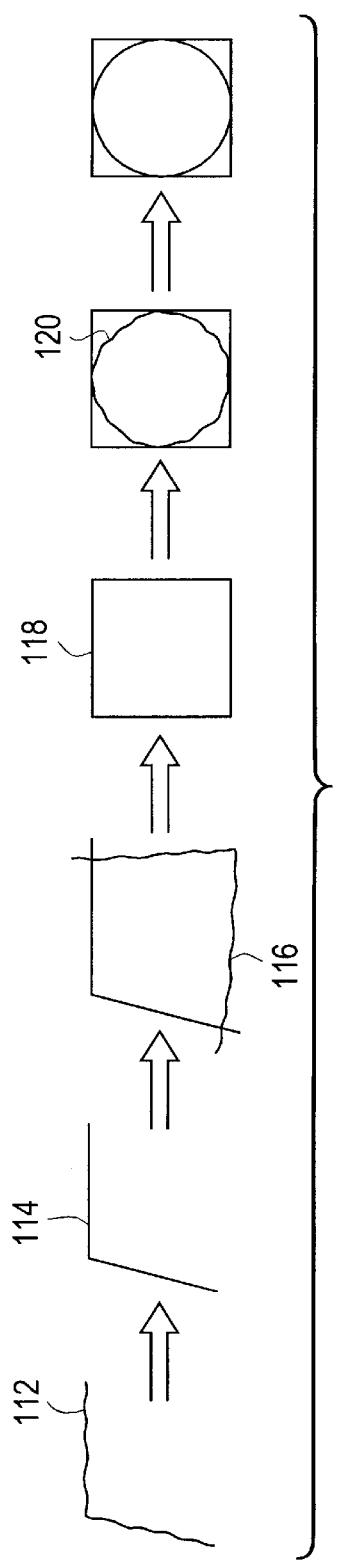
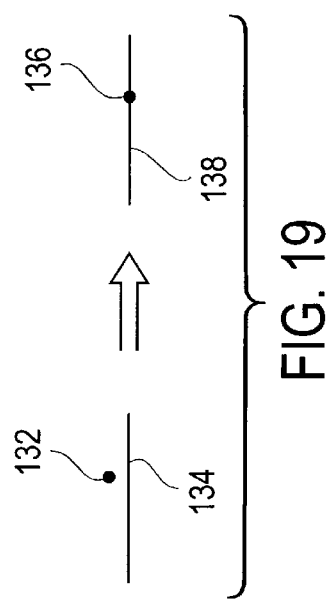
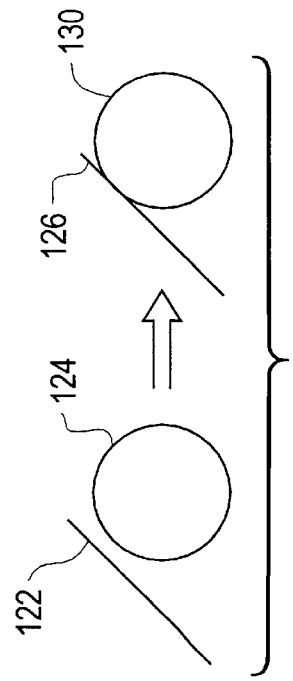
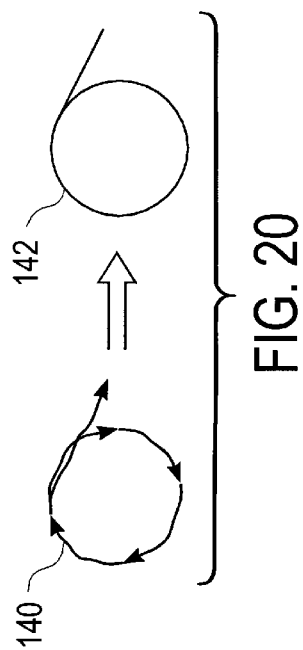

METHOD AND APPARATUS FOR PROCESSING A FREEHAND SKETCH

This is a Continuation Application of application Ser. No. 08/659,543, filed Jun. 6, 1996 now abandoned, which is a Continuation Application of application Ser. No. 08/289,608, filed Aug. 12, 1994 now abandoned.

FIELD OF THE INVENTION

The invention pertains to the field of computerized drawing methods, and in particular to methods which incorporate the providing of a drawing path satisfying precision criteria, from a drawing path lacking such criteria which is followed by a drawing indicator.

BACKGROUND OF THE INVENTION

The use of computers and computerized methods to provide drawings and designs is becoming more and more common.

A goal of computer-aided design (CAD) is to provide a designer with the capability to describe a design, analyze a drawing for a design, modify the design, and store copies of the drawings at all phases of the development process. Progress in CAD systems and methods, in some sense, can be measured by the flexibility offered to the designer and the complexity of the design and drawing that is possible.

The typical CAD approach calls for the user or designer to specify a geometric element such as a point, line or circle, and then to specify the size features of the element where applicable. By way of example, the user or designer might specify a circle, locate the center of the circle by positioning a cursor at the center, and then specify the size by moving the cursor a distance from the center equal to the desired radius for the circle. The system would then execute a drawing for such a circle and display it to the user. The information in the system and the display then reflects a precise circle (within the limits and tolerances of the system). Other precise geometry, then, can be added to the drawing using similar or analogous operations.

This approach, including the interaction with the user, of course is not in accordance with the natural way that human beings create drawings. That natural way involves the movement of a drawing implement by the user's hand. Further, many designers are most creative in "sketching out" drawings lacking in the standards applicable to formal drawings for a design.

The device sold by Apple Computer Inc. under the name Newton provides some sketching capabilities, perhaps best described as a "notebook" capability in a non-CAD environment. It is adapted to create more precise-looking, single-element paths, such as circles and ellipses, and more precise-looking, multi-element paths, such as a series of straight lines, from sketching by a user. It is also adapted to incorporate and impose concomitant geometric constraints, such as coincident end points for adjacent line elements.

The present invention provides sketching-type drawing capabilities consistent with and incorporated into a CAD environment. This includes a variety of geometrical constraints between drawing parts and elements which are of significance in a CAD environment. The geometrical drawing parts or elements include points, straight lines, open arcs, circles and ellipses.

With the capability to interpret a sketched indicator path as any one of these, there is also the capability to distinguish and recognize, delete and "areafill" symbols.

It also provides the capability to distinguish and interpret relatively complex multiple-element strokes. It does this by determining break locations for the elements along the stroke, and recognizing these elements before re-constituting a stroke meeting standards for precision.

SUMMARY OF THE INVENTION

In accordance with aspects of the invention directed to drawing part or element sketching, recognizing and defining, a computerized method is provided for generating information representative of a drawing path lacking in certain precision criteria and transforming the information to information representative of a drawing path not lacking in such precision criteria. A group of indicator information elements representative of locations of movement for an indicator in a path lacking in certain precision criteria, is generated. A group of transformed information elements representative of locations is then generated in response to these indicator information elements. The transformed group is operated on with a neural net and classified in response to this. Then, in response to this classifying, characteristics for the group of indicator information elements are generated, and a modified group of information elements representative of locations for a modified path not lacking in the precision criteria, is defined.

The modified group of information elements, as one example, can be representative of an open arc. The neural net includes output classifications representative of a circle, an ellipse, a plurality of arcs and a delete symbol.

The generating of the transformed group of information elements can include the transforming of the group of indicator information elements to a group of information elements representative of a group of rotated, scaled, translated and mapped locations in a predetermined grid. This group of information elements, where it is representative of locations in the predetermined grid which in turn are representative of a closed path, can be further transformed to a group representative of locations in the predetermined grid which in turn are representative of a translated closed path. Similarly, where the referenced group of information elements is representative of locations in the predetermined grid which in turn are representative of an arc open in one direction, the group can be further transformed to a group representative of locations in the predetermined grid which in turn are representative of an arc open in the opposite direction.

Additionally, information associated with the modified group of information elements, adapted for computer-aided design, such as information for determining represented dimensions, may be generated.

Further, the transformed group of information elements, as initially set forth, may also be tested against recognized patterns for information elements, for a match for classification purposes, with such recognized patterns including patterns representative of a line and a 45-degree arc.

In accordance with aspects of the invention pertaining to dividing a drawing stroke into parts or elements, a computerized method is provided for generating information representative of a drawing path lacking in certain precision criteria and selecting break information representative of breaks for segments of the drawing path. Indicator information elements representative of locations of movement of an indicator in a path lacking in certain precision criteria, are generated. Information elements are then classified in categories in response to classification standards. And break information elements are selected in response to the classifying and to break selection standards. The break information elements are to delineate limits for segments of information elements.

In performing the classifying of information elements, functions representative of a change in angle, of curvature, and of a change in slope for information elements are calculated, and the information elements are categorized in response to the calculating. Categorized information elements may then be re-categorized in response to the categorizing for adjacent information elements, achieving the initially-referenced classifications for information elements.

In the selecting of break information elements, potential break information elements may initially be selected in response to the initially-described classifying and in response to potential break information standards, and then information elements that are adjacent to potential break information elements may be operated on using a neural net. Potential break elements may then be eliminated in response to the neural net.

The segments of information elements may be adapted to represent locations which in turn are representative of a path including curved open and closed segments, or a path including straight and curved open segments.

In accordance with yet other aspects of the invention pertaining to both of the above aspects as well as to additional geometric constraint aspects, a computerized method is provided for generating information representative of a drawing path lacking in certain precision criteria and for transforming the information to a display representative of a drawing path not lacking in such precision criteria. Indicator information elements representative of locations of movement of an indicator in a path lacking in certain precision criteria, are generated. Break information elements to delineate limits for segments of information elements are defined in response to the generating. Modified groups of information elements representative of segments of a modified path not lacking in the precision criteria are defined. Geometric constraints among the modified groups of information elements are generated, and constrained groups of information elements representative of geometrically constrained segments are defined in response to the generating of the geometric constraints. Then a display is provided which is representative of a path not lacking in the precision criteria, and which is represented by information elements including the constrained groups of information elements.

The geometric constraints, for example, can include coincidence, parallelism, tangency and relimitation.

Additionally, information associated with the constrained groups of information elements for computer-aided design, including information to determine represented dimensions, can also be generated.

BRIEF DESCRIPTION OF THE DRAWINGS

In the drawings, exemplary embodiments demonstrating various objectives and features hereof are illustrated as follows:

FIG. 2, including

FIG. 17, in its first four parts, illustrates an analogous situation but for a square which is input by the user in two strokes. The last two parts of the figure then illustrate the addition of what is intended to be a circular stroke incorporating tangency constraints within the square, and the result which implements such constraints.

FIG. 18 illustrates, somewhat schematically, the imposition of a tangency constraint between a line and a circle.

FIG. 19 illustrates, somewhat schematically, a coincidence constraint between a line and a point.

FIG. 20 illustrates, somewhat schematically, a tangency constraint between a circle and a line, initially formed as a single stroke having two segments.

DETAILED DESCRIPTION

As indicated, detailed embodiments of the invention are disclosed herein. However, embodiments may be provided in accordance with various forms, some of which may be rather different from the disclosed embodiments. Consequently, the specific details disclosed herein are merely representative, yet in that regard are deemed to provide the best embodiments for purposes of disclosure and to provide a basis for the claims herein which provide the scope of the present invention.

Figure 1:
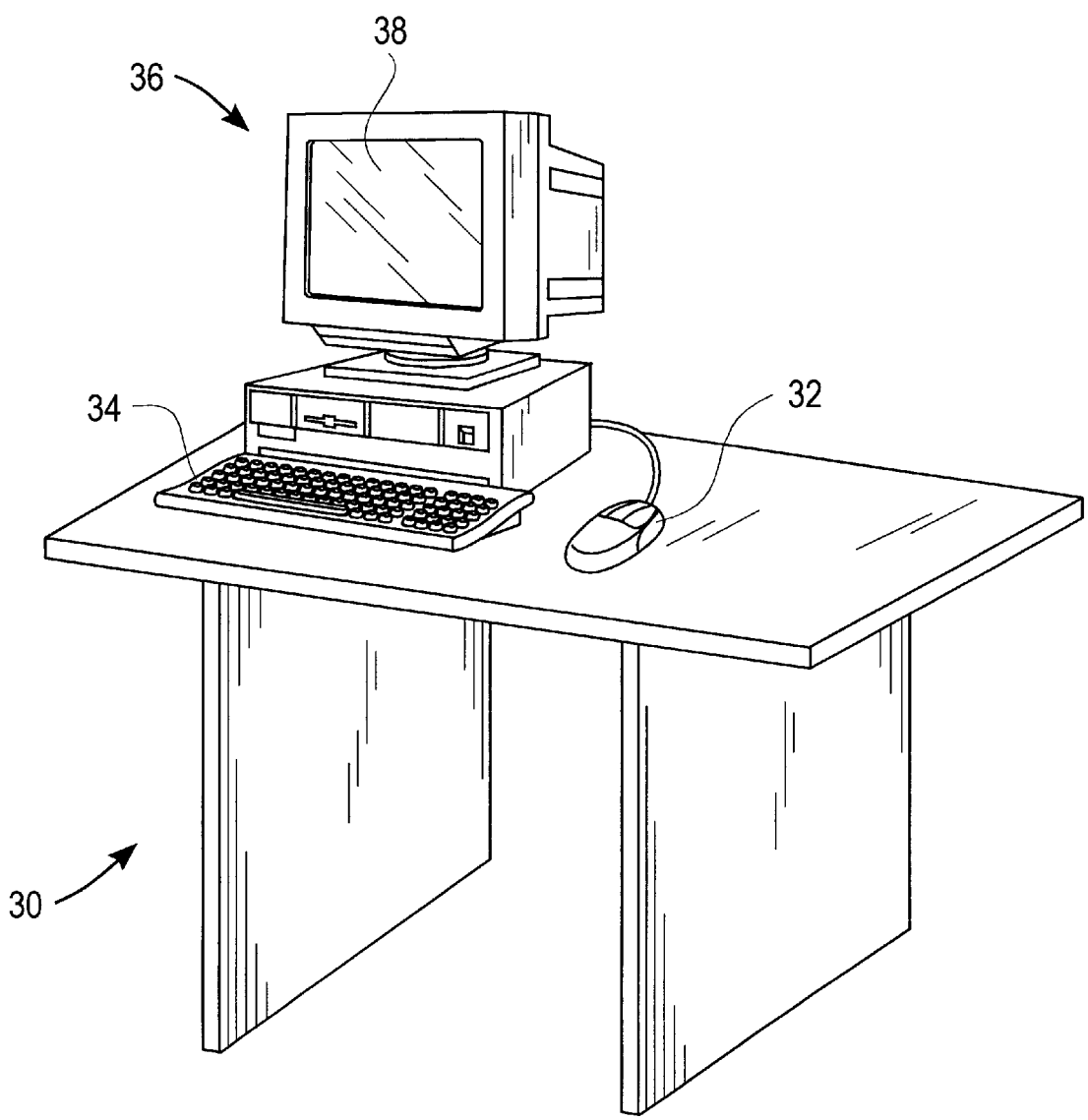
FIG. 1 shows a computer work station used in carrying out methods in accordance with the invention.

There is shown in FIG. 1 a workstation 30 for computer-aided design (CAD). Among the components of the workstation are a standard mouse 32 which can be moved and otherwise operated by the user as an input device for the workstation, a keyboard 34 and a display 36 having a display screen 38. The workstation 30, of course, has the physical outward appearance of a conventional workstation. However, the internal workings, the interactions with the user and mouse, the results in providing computer-aided designs and drawings, and the computerized information associated with such designs and drawings, are in accordance with and incorporate the present invention.

Figure 6:
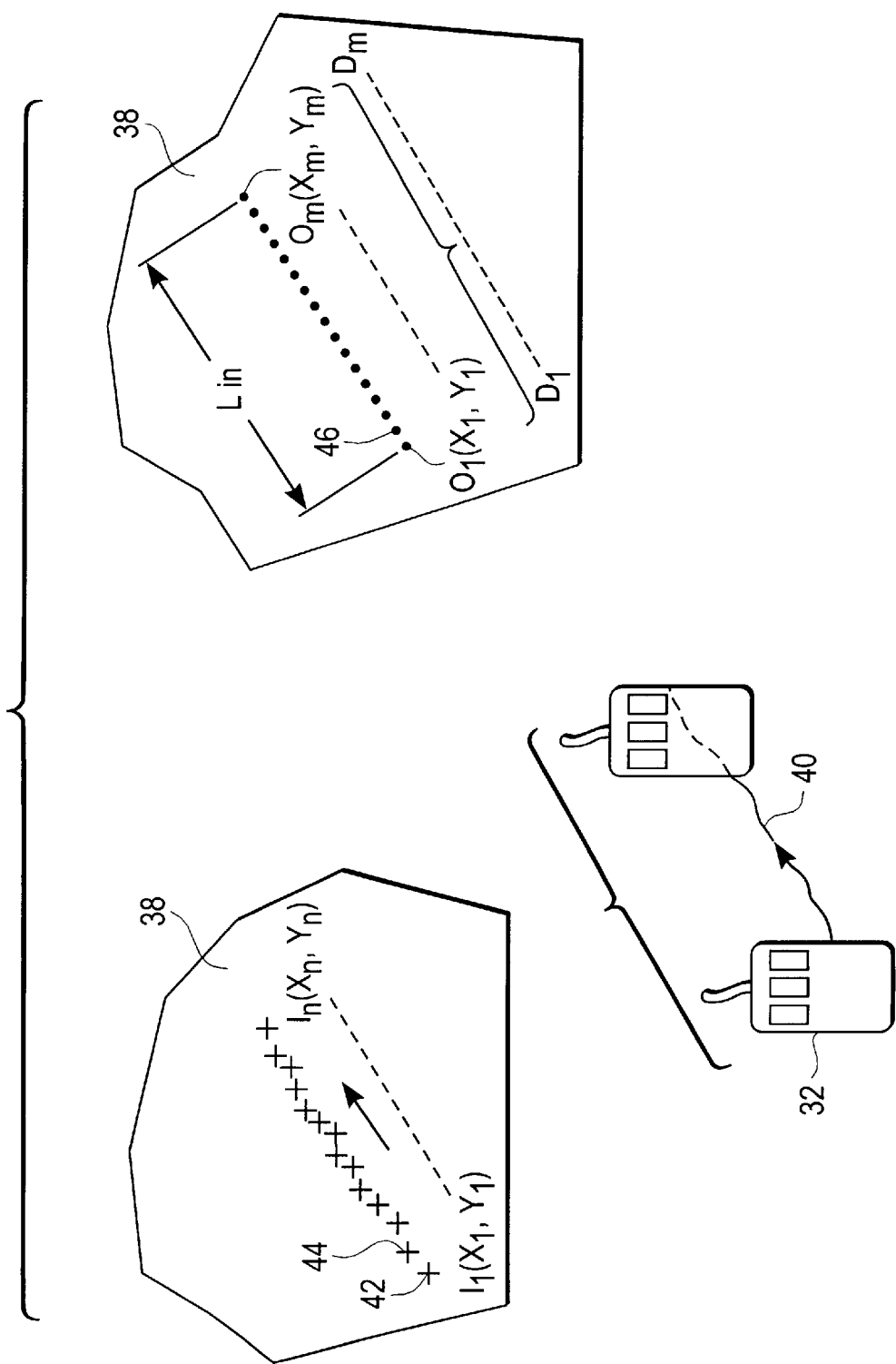
FIG. 6 shows and illustrates somewhat schematically, the movement of a mouse in a drawing stroke, the resulting movement of a display cursor, and a resulting display for a straight line segment, on the work station of FIG. 1.

FIG. 6 illustrates the mouse 32 as moved along a drawing path shown by a line 40. As with typical drawing paths resulting from the free-hand movement of an individual, the drawing path 40 lacks the standards and precision criteria normally associated with formal drawings, particularly those for use in the design of products and parts. Thus, although the user probably intended to follow the path of a straight, angled line, the path actually followed significantly departs from this standard. The beginning of the path could typically be indicated to the workstation by the user pushing down a button on the mouse, indicating the start of an intended path. And the end of the intended path could typically be indicated by the release of that button, or the re-pushing of the same button after its prior release, or the pushing of another button after the prior release of the first. The path, from the start to end, would then be typically considered a path stroke, in a fashion analogous to a stroke of a pencil or pen by an individual executing a drawing.

The series of crosses 42 shown on the display screen 38 of FIG. 6, then, represents, in illustrative form, the series of cursor positions on the display screen caused by the user's operations with the mouse 32. Similarly, the series of lighted locations 44, on the display screen, correspond to the series of cursor positions. Such lighted locations, of course, are typically denominated "points" on the display screen. Those points, if connected, represent a continuous path along the display screen. And assuming the workstation 30 and the display 36 having the display screen 38 (FIG. 1) have a fine enough resolution, the series of lighted points would typically have the appearance of a connected path to the user. The lighted series of points or locations 44, thus, represents a drawing path on the display screen 38 which corresponds to the drawing path 40 for the mouse 32. The series of points or locations, and the display path they represent, then similarly are lacking in the standards associated with a formal drawing.

In FIG. 6, the designation $I_1(X_1,Y_1)$ represents an information element provided internally by the workstation computer apparatus which represents the first point or location of the series of lighted points 42. The $X_1$ and $Y_1$ components of the information element are intended to schematically represent the location itself, for example the coordinates in a Cartesian coordinate system. A readily apparent alternative, of course, would be an angle and a radius in a polar coordinate system.

There, then, of course is such an internal information element for each of the points, as indicated by the dotted line from $I_1(X_1, Y_1)$ to $I_n(X_n,Y_n)$, a designation which represents the internal information element provided in the computer apparatus for the last point in the series of points 44. Again, the indicated designations are simply to represent information elements of the type typically used and employed in CAD systems.

Still referring to FIG. 6, there is shown at the right, a series of lighted locations or display points 46 which is a similarly illustrative, modified version of the input or indicator series of display points, as a result of the method described herein. These display points are representative of a display path which has been modified to conform to a straight, angled line not lacking in the standards or precision criteria previously mentioned—i.e., a straight line according to the standards and criteria of a formal design drawing. The modified display path which these points represent, then, is a "fixed up" version of the path 40 along which the user moved the mouse 42. The output designations $O_1(X_1, Y_1)$ through $O_m(X_m,Y_m)$ represent the information elements internally provided in the computer apparatus representative of the locations for the modified series of points or locations, determined in the computer apparatus.

Standard CAD systems and methods provide design and relationship capabilities for executing and relating detailed designs, drawings and views. As several examples, this includes some capabilities to automatically take account of changes in related views and to maintain and indicate dimensional information. The designations $D_1$ through $D_m$, associated with $O_1(X_1,Y_1)$ through $O_m(X_m,Y_m)$ in FIG. 6, are simply to indicate the existence of information elements in the computer system to carry out such standard CAD capabilities. And the presence of the dimensional representation of "L in." in an arrowed configuration between endlines, as part of the display, indicating the length of the straight line path represented by information elements $O_1(X_1,Y_1)$ through $O_m(X_m,Y_m)$, is simply illustrative of such standard dimension-related capabilities.

Figure 7:
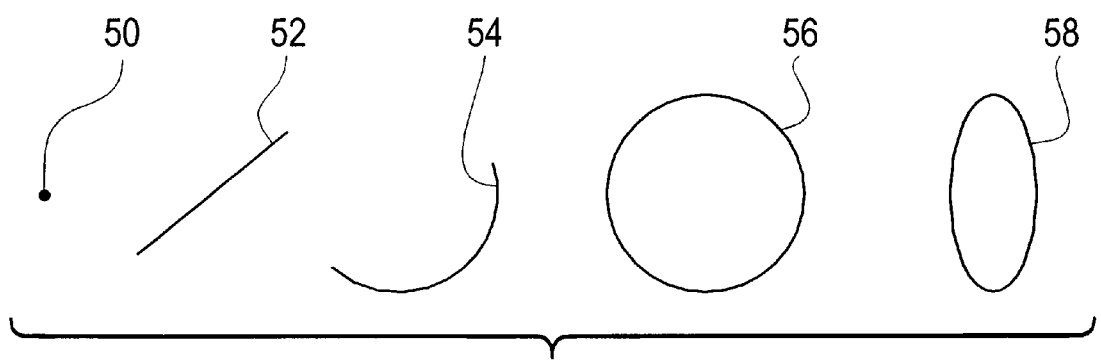
FIG. 7 illustrates geometrical segments (or elements) provided in accordance with the invention.

Referring to FIG. 7, the workstation 30 in accordance with the invention can generate information elements, representative of locations (or points) which are representative of a single point, a straight line, an open arc, a circle, or an ellipse, lacking in precision criteria or standards for a formal design or design drawing, and define a modified group of elements which are representative, respectively, of such geometric elements (or segments) with such precision criteria or standards not lacking. Such resulting segments are illustrated by the precise-appearing point 50, straight line 52, circle 54 and ellipse 56 shown in FIG. 7.

Figure 10:
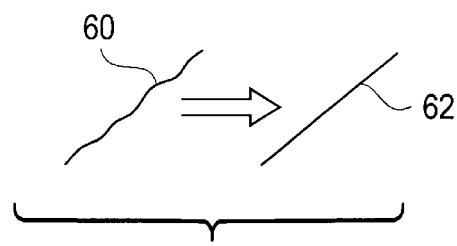
FIGS. 10 through 13 illustrate, somewhat schematically, geometrical segments (elements) for a user's hand movement, and thus having the lack of certain precision criteria associated with such hand movement, and resulting corresponding segments, not lacking in such criteria, in accordance with the invention.
Figure 11:
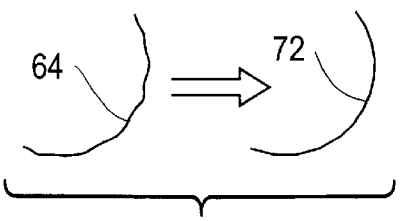
Figure 12:
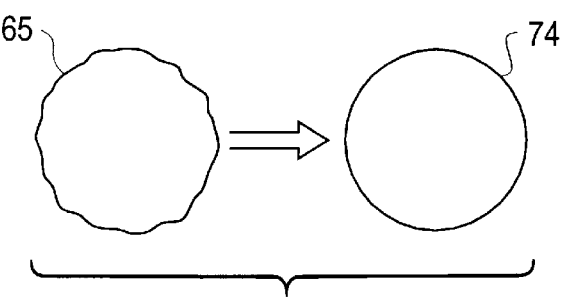
Figure 13:
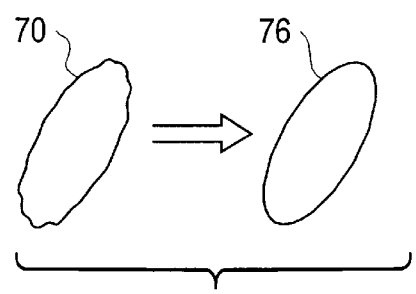

In FIG. 10, a drawing path 60 for the mouse 32, intended as a straight line, but lacking in the precision criteria, is shown at the left. Alternatively, this path could be considered to illustrate the path that would be represented by the indicator information elements that would be generated in the computer apparatus of the workstation to correspond to the path of the mouse or indicator, or such a path as displayed. At the right, a drawing path 62 which is represented by modified information elements provided in the workstation 30 is shown. This, of course, has the appearance of a straight line embodying the desired precision criteria. Analogously, such paths for an intended arc 64, an intended circle 66, and an intended ellipse 70 lacking in the precision criteria, are respectively shown at the left in FIGS. 11, 12 and 13, while drawing paths for an arc, a circle and an ellipse having the precision criteria are, respectively, shown at the right in FIGS. 11, 12 and 13.

The paths in FIGS. 10 through 13 are each for single-segment (or single-element) strokes. Thus, the workstation can recognize, categorize and operate on a straight line segment, an arc, a circle and an ellipse, as a single defined geometrical segment or element. The same, of course, applies for a point.

Figure 14:
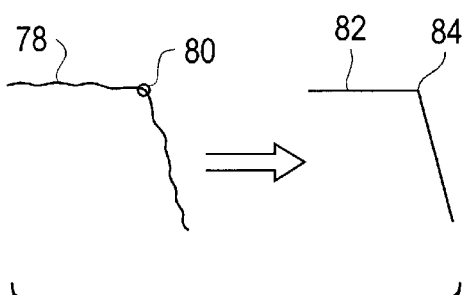
FIG. 14 illustrates, somewhat schematically, at the right a stroke consisting of two straight lines which meet at a corner break, and at the left the stroke for the hand movement of the user resulting in the former stroke.
Figure 15:
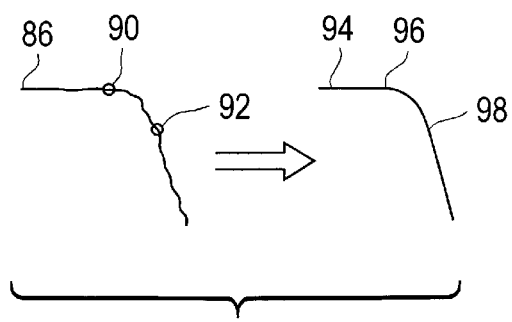
FIG. 15 illustrates, somewhat schematically, at the right a stroke having two straight line segments, one arc segment and two breaks, and at the left the stroke for the hand movement of a user which resulted in the former stroke.

In FIGS. 14 and 15, paths for multi-segment strokes are illustrated. At the left in FIG. 14, is a path 78 analogous to the paths at the left of FIGS. 10 through 13, but for a stroke which is intended to be two straight line segments which come together at a corner break. In this case, the workstation 30 does recognize the intended corner break, indicated by the small circle 80. This entails the identification of an information element in the computer representative of a break location or break point. The two segments in the stroke having a junction delineated by that break point can then be separately recognized as straight lines and treated separately, except for the common break point. The result is a path 82 incorporating, with the desired precision, two straight line segments joined in a corner break at 84.

In somewhat analogous fashion, in FIG. 15 at the left, there is a stroke path 86, recognized as incorporating two break points, as indicated by the small circles 90 and 92. Here, two information elements representative of the locations or points for these breaks are identified. And the path is recognized as a three-segment path, including two straight lines joined by an arc, in a fillet configuration. The three segments, once the breaks are identified, can be recognized and treated separately to then together define information element segments representative of the three-segment path 94, having breaks 96 and 98, shown at the right in FIG. 15.

Figure 8:
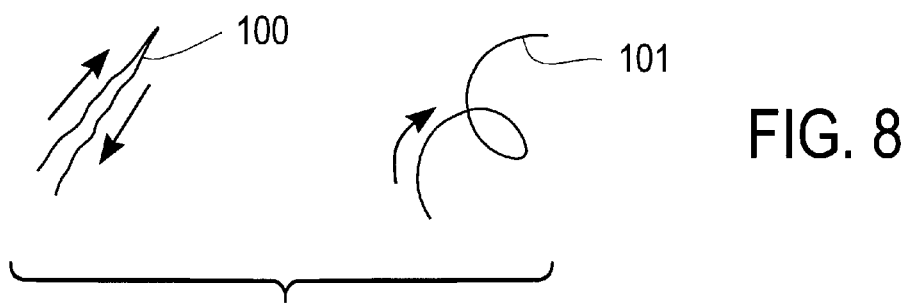
FIG. 8 illustrates the areafill and delete command strokes.

In FIG. 8, there is shown, at the left, a typical mouse path 100 for an areafill command symbol. This can also be considered as the path which is represented by the indicator information elements which are generated by the movement of the mouse as the path indicator, or such path as displayed. At the right, is the analogous situation, but for the path 101 for a delete command symbol. As indicated, if these symbols were used as components in a geometric path being constructed, they would typically be considered multi-segment (or element) strokes. But due to their distinctive natures, and the nature of the geometric path components which are recognized and allowed, these command strokes are ultimately treated as single whole segments or elements in connection with the recognition and use of the areafill and delete commands.

Figure 9:
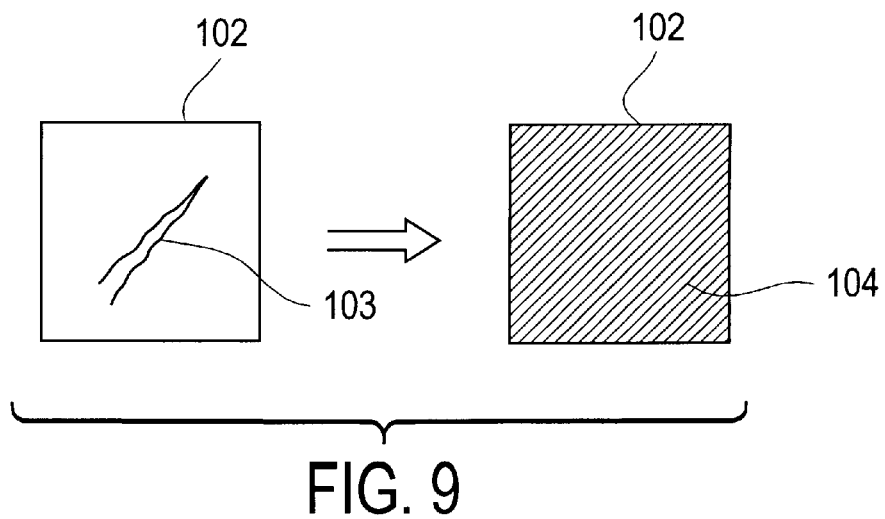
FIG. 9 illustrates an areafill stroke and the closed area to which it applies, and the resulting cross-hatch pattern in the area in response to the stroke.

In FIG. 9, at the left, there is shown a display screen path 102 for a square which has been subject to the precision enhancement, and a display path 103 for an areafill symbol corresponding to an areafill movement of the mouse 32. The result, a cross-hatched fill 104 of the area within the square, at the general angle of the areafill symbol, is shown at the right.

Figure 16:
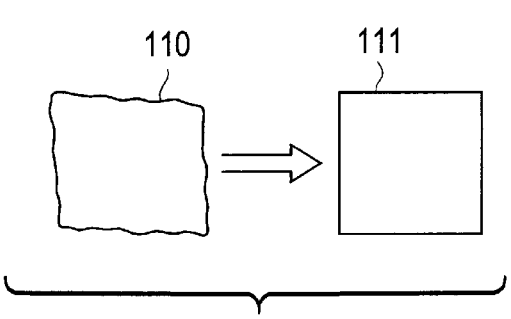
FIG. 16 illustrates, somewhat schematically, how a stroke generated by user, and lacking in parallel and relimitation geometric constraints, results in a square which incorporates such constraints, in accordance with the invention.

In FIG. 16, a display drawing path 110 corresponding to a mouse drawing path which is intended to be a square is shown at the left. The arrows along the path indicate the direction of movement for the single stroke path. As indicated, true parallelism for the opposite sides of the path is lacking. Additionally, at the beginning and end of the path, there are extensions beyond a true corner location. This path, of course, could also be considered as illustrative of the mouse path itself. And the indicator information elements generated in the CAD workstation 30 (FIG. 1), of course, resulting from the mouse path, are representative of this display drawing path. The path 111 at the right, of course, reflects the capability to locate breaks, to recognize intended straight lines, and to generate modified information elements for such lines. However, it also reflects the capability to provide constrained information elements, reflecting the intended parallelism constraint between the pairs of opposite sides, and also reflecting relimitation constraints. At the right, in FIG. 16, the relimitation constraints are reflected in the relimitations of the sides of the square which come together at the start and end of the path so that the extent of each is limited to provide a corner at the lower left. The path 111 can be viewed as a path represented by the information elements provided in the computer system which incorporate all of the referenced aspects, including the constraints, or such path as displayed.

In FIG. 17, such parallelism and relimitation constraints are illustrated, as well as tangency constraints. Display paths resulting from mouse paths (or what could also be viewed as the mouse paths themselves), are illustrated by the arrowed paths in the first, third and fifth frames of the figure. The non-arrowed display paths reflect, as needed, the break recognition, segment recognition and treatment, and the constraint recognition and treatment capabilities. These, of course, can also be regarded as the paths represented by information elements which have undergone the modifications or transformations to accomplish the corresponding aspects.

Thus, in the first panel of FIG. 17, there is a single stroke drawing path 112. In the second panel, that path has been converted to a path 114 reflecting two straight line segments which are joined at a corner and which are at an angle to one another of somewhat greater than 90 degrees. In the third panel, another path 116 has been added as a result of movement of the mouse. That additional path indicates that it was the intent of the user to draw a square using two strokes. The parallelism constraints related to the opposite sides and the relimitation constraints related to where the strokes cross, are recognized, and they are reflected in the square path 118 of the fourth panel of the drawing. That path, of course, also reflects that the new drawing path added in the third panel was recognized as two straight lines which come together at a corner break. In the fifth panel, additional movement of the mouse has added a single stroke path 120 which was intended to be a circle within the square, tangent to each of the four sides. In providing this result, in the sixth panel, the new path has been recognized as an intended circle, and the tangency constraint between the circle and each of the four sides of the square has been recognized and is reflected.

FIGS. 18 through 20 also illustrate geometrical constraints. Without the tangency constraint, a stroke intended to be a straight line, followed by a stroke intended to be a circle might be displayed as a straight line path 122 and a non-intersecting circle 124, as at the left in FIG. 18. However, due to the tangency constraint, an intended tangency relationship is recognized. The result is a straight line path 126 and a circular path 130 that are tangent to one another. Analogously, without the coincidence constraint, the result might be a separated point 132 and straight line 134 at the left in FIG. 19. With the coincidence constraint, the result is a point 136 which is coincident with a straight line 138.

In FIG. 20, the tangency constraint is illustrated for a single stroke display path which was intended to be a circle and a tangential line extending from the circle. The display path 140 in which the circle is lacking in precision standards, the straight line is lacking in precision standards, and the tangency does not quite exist, is reflected at the left. At the right, there is the altered display path 142 including the circle and the tangentially extending line.

Figure 2A:
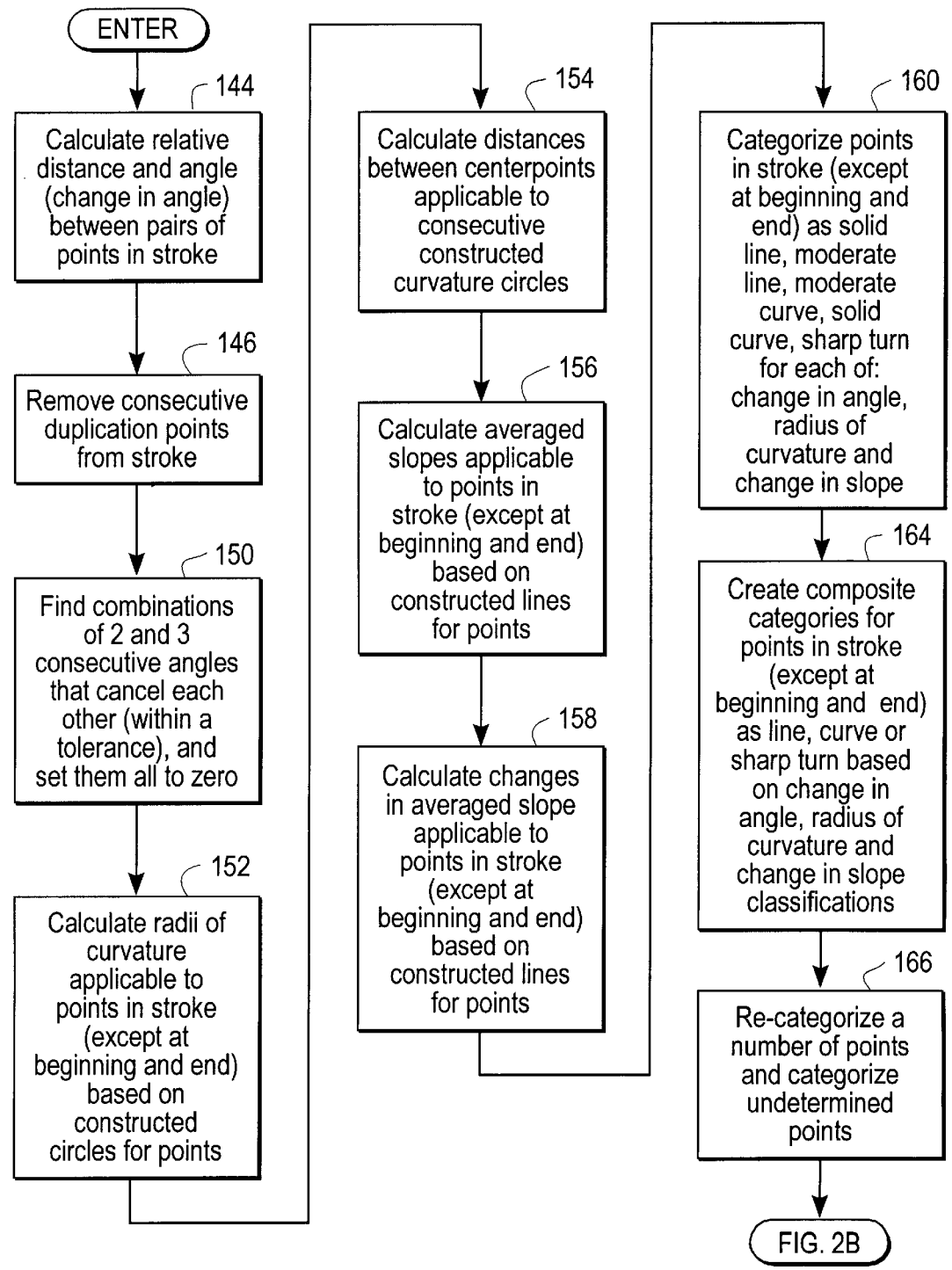
FIGS. 2A and 2B, is a flow diagram showing steps for breaking a stroke into segments.
Figure 2B:
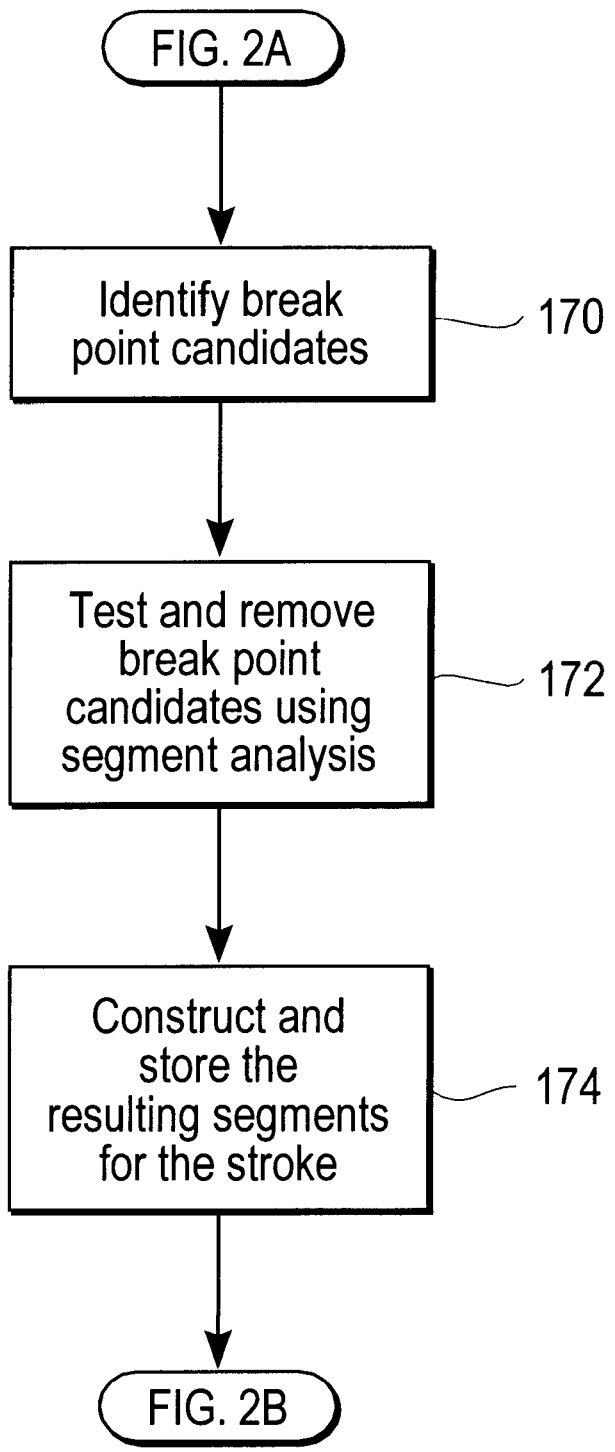
Figure 3:
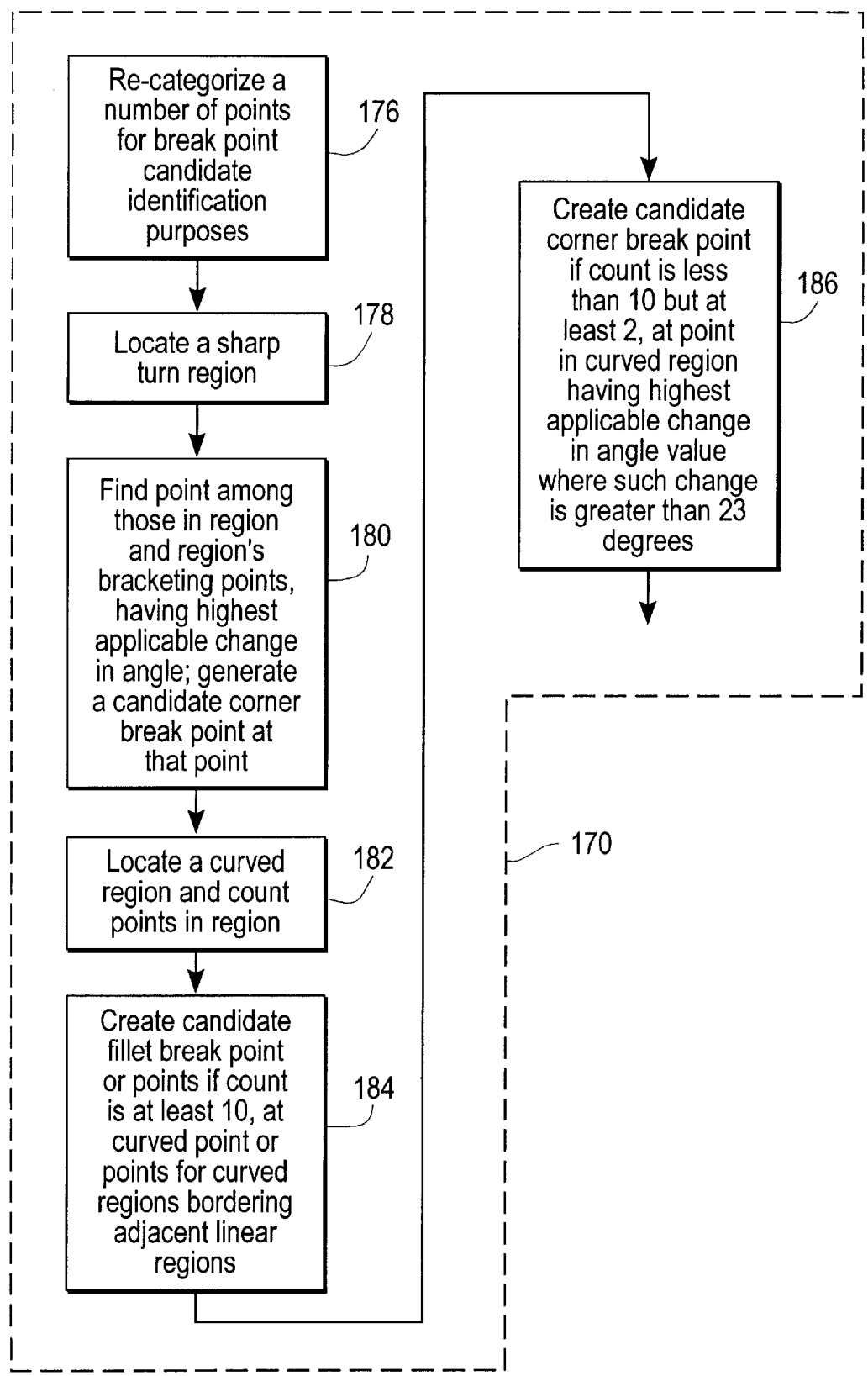
FIG. 3 is a flow diagram showing, in more detail, part of FIG. 2.
Figure 4:
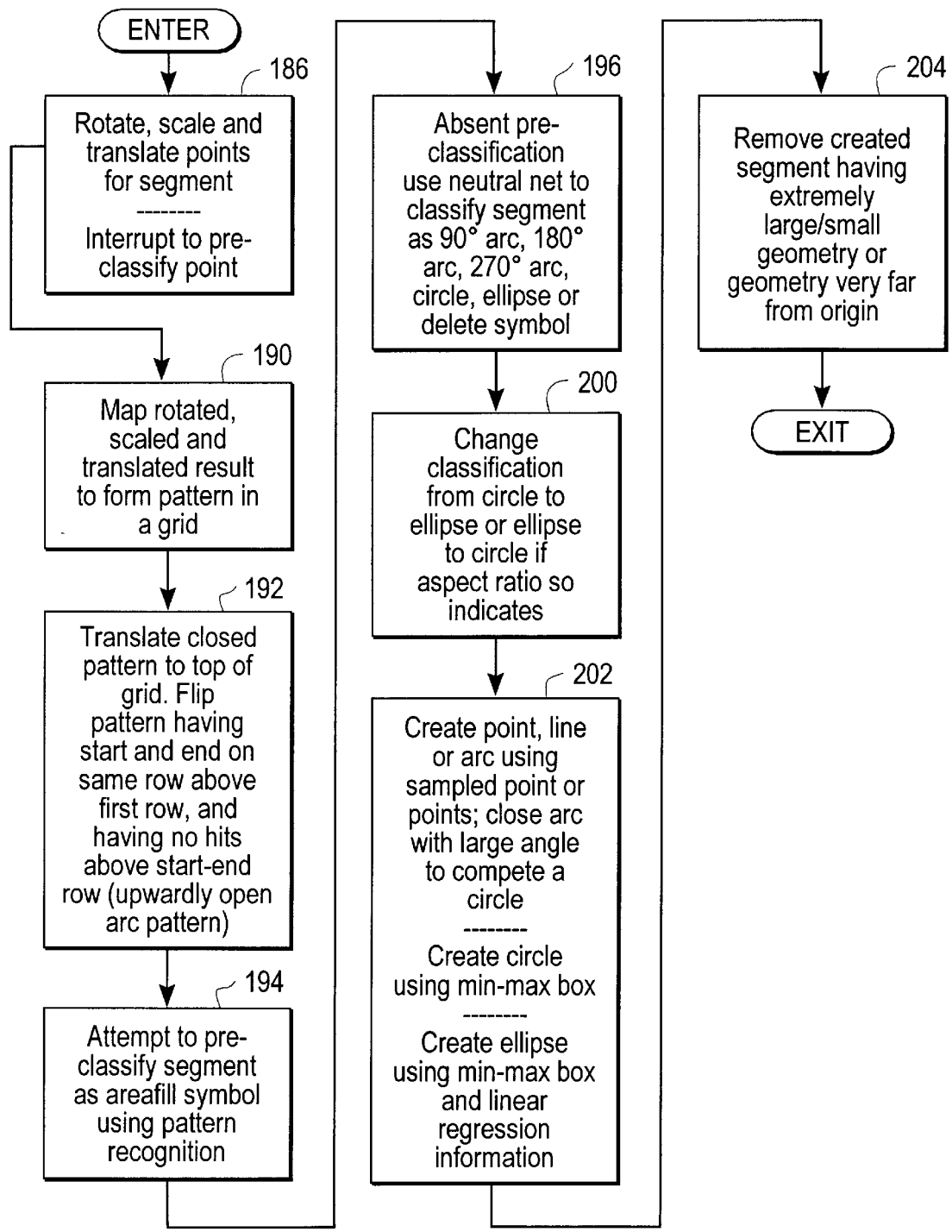
FIG. 4 is a flow diagram showing steps in creating a segment which is a point, straight line, arc, circle or ellipse.
Figure 5:
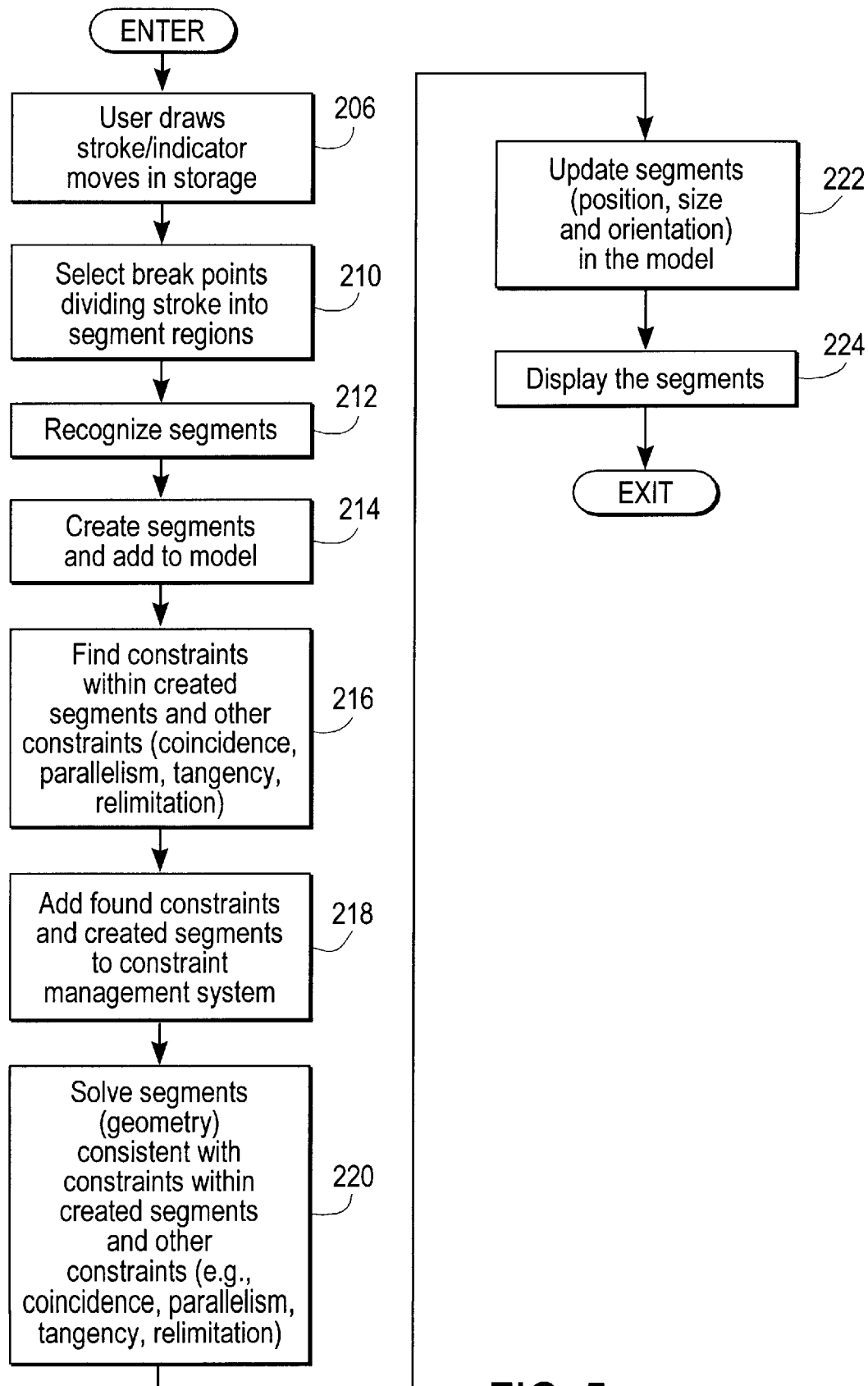
FIG. 5 is a flow diagram showing steps in accomplishing the display of segments resulting from a user drawing a stroke (moving an indicator in a stroke), including the aspects shown in more detail in FIGS. 2 through 4, and including the imposition of geometrical constraints within segments of an immediate stroke and other geometrical constraints from outside the immediate stroke.

The flow diagrams of FIGS. 2 and 3 are directed to the method for determining break locations to delineate segments for a stroke. The flow diagram of FIG. 4 is directed to the creation of segments embodying the desired precision standards from segments which lack such standards. And the flow diagram of FIG. 5 is directed to the more comprehensive method which incorporates the aspects of FIGS. 2, 3 and 4, as well as geometrical constraint aspects.

Turning to the recognition of breaks to delineate segments in multiple-segment strokes, for the indicator elements which are generated in the computer apparatus in response to the movement of the mouse 32 (FIG. 1 and FIG. 6), of course, each includes a representation for a location or point.

Once this location or point stream is stored in the computer, through the stored indicator elements, the break location recognition (break point recognition) can start with operations that can be described as directed to the calculating of geometric characteristics which are applied to the points of the stream, and the filtering of the point stream.

In carrying this out, the relative distance and angle (meaning change in angle) between pairs of points in the point stream for a stroke, as represented by the indicator information elements, are calculated. Thus, referring, for example to the second, third and fourth points for such a stroke, the distance which the second point is from the first point is calculated, the distance of the third point from the second is calculated, and the distance of the fourth point from the third is calculated. Similarly, the difference in angle of the line between the third and second point, and the line between the second and first point is calculated and applied as the change in angle applicable to the second point. And the change in angle of the line between the fourth and third point, from the line between the third and second point, is calculated and applied as the change in angle applicable to the third point. This is carried out for all the indicator element-represented points in the stroke, except as is readily apparent, there can be no change in angle applicable to the first and last points and no distance applicable prior to the first point or after the last point. This is as indicated at the start of the flow diagram of FIG. 2A (Block 144).

Although settings could be made to require a minimum distance movement and minimum time interval, beyond such intervals resulting from the normal communication delays within the parts of the workstation 30 itself, from one indicator element generated in the computer apparatus to the next, it has been found advantageous to not require such minimal intervals, but in effect to allow the position of the mouse to be sampled generally as often as the workstation can do so. As a result, there can be duplicate indicator points represented by the indicator information elements in the computer apparatus. These duplicate points may be considered surplus information. And other surplus information or noise, of course, will typically exist.

Therefore, consecutive duplicate points (which of course could be within a tolerance) as represented by the indicator information elements are eliminated from the stroke as stored in the workstation (Block 146). Then, as a noise removal aspect, within a tolerance, combinations of two and three consecutive angles applicable to consecutive points are tested to see if they will cancel out, and thus can be set to zero, as more or less representative of unintentional "wiggling" of the mouse by the user as the mouse was used (Block 150). For example, a series of changes in angle applicable to points, of 5, 10, −15, 20, 5, 5, 10, −10, 0, is altered to changes in angle of 0, 0, 0, 20, 5, 5, 0, 0, 0. (This, of course, does not however mean that the information elements for these points are altered to somehow take account of this.) The units for these changes in angle might typically be representative of degrees of angle. Of course, these operations are part of the calculating of geometric characteristics and the filtering, for break recognition, referred to above.

As a continuation of this process, radii of curvature applicable to points for the stroke, except for reasons which will become clear, points at the beginning and end, are calculated based on constructed circles for the points (Block 152). As indicated, this is done after the duplicate points have been removed but any cancellation of changes in angle, of course, does not affect the actual underlying points. Concerning this calculation of radii of curvature, except at the beginning and end to which this cannot apply, a radius of curvature is calculated for each point based upon a circle constructed by using that point, one located six points preceding it, and one located six points postceding it. Thus, by way of example, given the points $p_1, p_2, p_3, \ldots, P_n$, the radius of curvature applicable to point $p_7$ is determined by constructing a circle through points $p_1, p_7$ and $p_{13}$. And the radius of curvature applicable to point $p_8$ is determined by constructing a circle through point $p_2, p_8$ and $p_{14}$. (This radii of curvature information is normalized to remove scale factors which may have been entered by the user to change the particular scale that might apply to a display of what is represented in the computer system at this point.)

After this, for consecutive pairs of the centerpoints for the curvature circles that have been found, the distances between such centerpoints are calculated (Block 154). (Again, this is normalized to eliminate scale factors which may have been imposed in a particular display for the user.) Then, after that, an averaged slope which is applied to each point but the first three and last three, is calculated and applied to the points for the stroke (156). The calculation is done by finding the slope of the line defined by a point three positions preceding and three positions postceding the evaluation point. By way of example, given the points $p_1, p_2, p_3, \ldots, p_n$, the slope for the point $p_4$ is determined by constructing a line through the points $P_1$ and $p_7$. The slope for the point $p_5$ is determined by constructing a line through the points $p_2$ and $p_8$.

This is then followed (at Block 158) by the use of the averaged slopes that have been calculated for points in calculating changes in averaged slope which are applicable to points. The change in averaged slope applicable to a point is calculated by determining the difference between that point's calculated averaged slope and the calculated averaged slope for the prior point. Of course, this will exclude the three beginning and three end points.

This concludes what may be considered the part of the break recognition process which is directed to calculating geometric characteristics and filtering.

The next set of operations is conveniently regarded as the aspect directed to classifying the regions of the stroke.

In doing this (at Block 160), a category is applied to the points for each of the absolute value of the change in angle applicable to the point, for the curvature which is applicable to the point, and for the absolute value of the change in slope which is applicable to that point. The categories can be conveniently regarded as an attempt to categorize the region in which the point occurs based on the indicated variable. The categories are then regarded as the following:

1. Solid Line—indicative of very linear;
2. Mixed Line or Moderate Line—indicative of moderately linear;
3. Mixed Curve or Moderate Curve—indicative of moderately curved;
4. Solid Curve—indicative of very curved; and
5. Sharp Turn—indicative of an extreme or severe turn.

Continuing with the accomplishing of this categorizing, the following values are designed as limit values for what can be regarded as the following descriptive designations:

| TINY SLOPE | STRAIGHT SLOPE | SMALL SLOPE | BIG SLOPE | BIG CURVATURE |
|---|---|---|---|---|
| 0.01 | 1.25 | 5.00 | 15.00 | 9.00 |

Here, the slope values are given in degrees, and the curvature value is in inches. (Again, here, curvature, which is the only one of these that would be affected by scale factors, is normalized and such scale factors are removed.)

Then, there are criteria based on this, for classifying a point based on the change in angle applicable to the point, as Solid Line, Mixed Curve or Solid Curve. Specifically, if the absolute value of the change in angle is less than Tiny Slope, the category is Solid Line. If the absolute value of the change in angle is greater than or equal to Tiny Slope and less than or equal to Small Slope, the category is Mixed Curve. If the absolute value for the change in angle applicable to the point is greater than Small Slope, the category for that point based on the change in angle is Solid Curve.

Similarly, if the absolute value of the radius of curvature applicable to the point is greater than or equal to Big Curvature, the category based on curvature and applicable to the point is Solid Line. On the other hand, if the absolute value of the radius of curvature is less than Big Curvature, the category is Solid Curve.

Turning to the absolute value of the change in slope applicable to a point, if the absolute value of the change in slope is less than or equal to Straight Slope, the category applicable to that point based on change in slope is Solid Line. If the absolute value of the change in slope is greater than Straight Slope and less than or equal to Small Slope, the category is Mixed Curve. If the absolute value of the change in slope is greater than Small Slope and less than or equal to Big Slope, the category is Solid Curve. And if the absolute value of the change in slope is greater than Big Slope, the category is Sharp Turn.

From this information as represented and stored in the computer apparatus, composite categories can then be applied to the points for which these determinations have been made (Block 164). The composite categories are considered to be Line, Curve or Sharp Turn, based on the categories for the change in angle, curvature and change in slope that have been determined. The composite classifications for the various possibilities are as follows:

| CHANGE IN ANGLE | CURVATURE | CHANGE IN SLOPE | RESULT |
|---|---|---|---|
| Solid Line | Solid Line | Solid Line | Solid Line |
| Solid Line | Solid Line | Mixed Curve | Mixed Line |
| Solid Line | Solid Line | Solid Curve | Mixed Curve |
| Solid Line | Solid Line | Sharp Turn | Sharp Turn |
| Solid Line | Solid Curve | Solid Line | Mixed Curve |
| Solid Line | Solid Curve | Mixed Curve | Mixed Curve |
| Solid Line | Solid Curve | Solid Curve | Mixed Curve |
| Solid Line | Solid Curve | Sharp Turn | Sharp Turn |
| Mixed Curve | Solid Line | Solid Line | Mixed Line |
| Mixed Curve | Solid Line | Mixed Curve | Mixed Curve |
| Mixed Curve | Solid Line | Solid Curve | Mixed Curve |
| Mixed Curve | Solid Line | Sharp Turn | Sharp Turn |
| Mixed Curve | Solid Curve | Solid Line | Mixed Curve |
| Mixed Curve | Solid Curve | Mixed Curve | Solid Curve |
| Mixed Curve | Solid Curve | Solid Curve | Solid Curve |
| Mixed Curve | Solid Curve | Sharp Turn | Sharp Turn |
| Solid Curve | Solid Line | Solid Line | Mixed Line |
| Solid Curve | Solid Line | Mixed Curve | Mixed Curve |
| Solid Curve | Solid Line | Solid Curve | Mixed Curve |
| Solid Curve | Solid Line | Sharp Turn | Sharp Turn |
| Solid Curve | Solid Curve | Solid Line | Mixed Curve |
| Solid Curve | Solid Curve | Mixed Curve | Solid Curve |
| Solid Curve | Solid Curve | Solid Curve | Solid Curve |
| Solid Curve | Solid Curve | Sharp Turn | Sharp Turn |

This chart thus shows how the composite category applicable to a point is determined from the category applicable to the point for the change in angle, curvature, and change in slope variables. With regard to this chart and FIG. 2A (at Block 164), it should be noted that the sub-categories for different Line classifications, nevertheless, are Line classifications. Similarly, the sub-classifications for different Curve classifications, nevertheless, are all Curve classifications.

Still as part of this aspect of classifying regions of the stroke, where there are "outlyer" points that are clearly anomalies within series of points, it is preferable that they be re-categorized (Block 166). This would apply to a single curved point found within a long stream of very linear points, with its re-categorization to a linear point. Similarly, indeterminate points are preferably categorized based on adjacent points. (As already indicated, this would include a number of points at the beginning and a number of points at the end.)

After this classification aspect is carried out, the aspect directed to the identification of break point candidates (at Block 170 in FIG. 2B) can occur. This aspect includes features directed to the fixing up of point categorizations for break point identification purposes, the finding of corner break candidates, and the finding of fillet break candidates. These will all be treated in additional detail below in connection with FIG. 3. However, still referring to FIG. 2B (at Block 172), there are also operations directed to the testing and removal of break point candidates using segment analysis.

This involves, how part of the stream of points which, presumptively, would be broken into two segments for treatment and recognition in accordance with the operations of FIG. 4, might test as a potential single segment under those operations with the point which has been identified as the candidate break point removed. This, of course, will be understood in more detail in connection with the description of the operations set out in FIG. 4, regarding the treatment of individual segments.

Then, again referring to FIG. 2B (at Block 174), after potential break point candidates may have been removed, the true break points remain. And going back to the points or locations initially stored in the computer apparatus as a result of the movement of the mouse (in the form of the indicator information elements representing points or locations), without any of the changes or modifications which have been described in connection with the break point identification (apart from the removal of points which are removed candidate break points and the removal of duplicate points), the resulting segments in the stream of points, have been delineated by the final selected break points, and these segment streams of points (in the form of indicator information elements) are constructed and stored as the resulting segments for the stroke.

Turning to FIG. 3, and the fixing up of point categorizations, the finding of corner break candidates, and the finding of fillet break candidates referred to only generally, above, such fixing up can occur (at Block 176) by a re-categorization of a number of points for break point candidate identification purposes.

Initially, if the composite categorizations for all the points in the stream are curved, neither such re-categorization nor the finding of break points, corner or fillet, is required at all. It should be borne in mind, in this connection, that a Sharp Turn composite classification, is considered a Curve classification for this particular purpose. So the distinction between these two classifications, for this purpose, is not important. It should also be borne in mind that this also implements the condition, noted elsewhere, that a delete symbol is a single segment stroke.

So, assuming all of the points are not curved, the operation directed to the re-categorizing (Block 176 in FIG. 3) is undertaken. One form of potential re-categorization, relates to Sharp Turn regions. An example of such a region would be a series of composite classifications for a series of points as follows: Line, Line, Curve, Curve, Curve, Sharp Turn, Sharp Turn, Sharp Turn, Curve, Curve, Curve, Line, Line.

Typically, in a situation such as this, the Curve points immediately bracketing the Sharp Turn region are not really curved. There simply is a gray area in the transition from one Line region to another Line region. So, in a situation such as this, the classifications for these points are converted to Line classifications, so the series would be: Line, Line, Line, Line, Line, Sharp Turn, Sharp Turn, Sharp Turn, Line, Line, Line, Line, Line.

However, in a situation such as this, it is possible that the Curve region is not merely a gray area (i.e., the user has drawn a line, followed by an arc at a sharp angle to the line). To accommodate this, only a limited number of point classifications are converted on either side of a Sharp Turn region. A limit of nine has been found convenient and effective.

Although in the specific example, there are three consecutive points that are Sharp Turns, a single Sharp Turn point is sufficient to set in motion the re-categorization of Curve points on either side of the Sharp Turn point.

Another re-categorization operation (Block 176) occurs where a substantial number of consecutive points have a change in angle less than some minimum absolute value, for example 0.01 degree. In a circumstance such as this, all of such points in the region are re-categorized to Line. The chart for the composite classification results, provided above, reveals that it is possible for a point with a very small change in angle to have a composite classification of Curve. The indicated re-categorization simply recognizes that those classifications typically are noise, and should be corrected. Requiring a minimum of nine such consecutive points to undertake the re-categorization has been found convenient and effective.

Still focusing on the re-categorization (Block 176), points having a composite categorization of Mixed Curve (Moderate Curve) but also having a very small change in angle, also are converted to composite classifications of Line. The same 0.01 degree cut-off has been found convenient and effective, for this.

After any such re-categorizations, the actual selection of a candidate break point can start with the locating of a Sharp Turn region (Block 178 of FIG. 3). Typically, again, there would at least be a short series of consecutive Sharp Turn composite classifications. However, only one is required.

After the Sharp Turn region is identified, the points in that region along with the two points bracketing the region on either side (which then would not be Sharp Turn points) are considered together, and the point among these having the highest absolute change in angle value is found. That point, then, is set up as a candidate corner break point (Block 180). This, of course, is done for each Sharp Turn region.

Turning to the identification of candidate fillet break points, which of course are break points related to a curved form of a turn rather than a corner form, Curve regions are identified and used in instances of attempting to locate fillet break points. Referring to this aspect of FIG. 3 (Block 182), there is the operation directed to locating a Curve region and counting the points in the region. If the count is sufficient (a convenient and efficient number, as in the figure, is a count of at least ten), and the bracketing points for the region are categorized as Line, then candidate fillet break points are selected at the edge Curve points for each end of the region (Block 184). (A readily apparent alternative would be to select the edge Line points.) If the number of points in the Curve region is insufficient (for example, less than ten), but there are enough points for a candidate Corner break point (for example, at least two, as in the figure), then there is the potential for instead generating such a Corner break point (Block 186). In this circumstance, the point is found in the Curve region with the highest absolute value of its change in angle. If this value is above a certain minimum (for example, twenty-three degrees, as in the figure), then a candidate Corner break point is generated at this location (Block 186).

Of course, from what has been described and shown (e.g., see FIG. 15), and with reference to FIG. 3, it should be apparent that a candidate fillet break point for a region of the fillet type is only generated at an edge which has a Line point adjacent. Therefore, it is possible that one or two candidates may be generated for such a region.

Now that the identification of break point candidates (Block 170 in FIG. 2B) has been described in additional detail with reference to FIG. 3, the testing and removing of break point candidates (Block 172 in FIG. 2B) will be further described.

Initially, a juncture has been reached where, through the candidate break points, the stream has been delineated into candidate segments. However, as part of the break identification and selection procedure, the segment classification procedure, which will be described in more detail in connection with FIG. 4, is invoked to classify the various candidate segments delineated by the candidate break points. These candidate segments are based on the initial indicator element locations or points generated by the movement of the mouse 32. As a result of this, there may be parts of the stroke where this classification indicates that a line comes together with a line. Similarly, there may be a result which indicates that a line leads into an arc or circle or an arc or circle leads into a line. Another possibility is that an arc or circle leads into another arc or circle.

Simply stated, the testing for the removal of break point candidates (Block 172 of FIG. 2B) involves, with certain qualifications, the testing of adjacent segments of the types noted, according to that same segment classification procedure (FIG. 4), but with the break point for the intersection of the two segments eliminated. This is done to determine if the segment classification procedure will yield a valid single segment classification without the break point present. If so, the break point candidate, along with its indicator element, is simply eliminated for all purposes herein, to provide a single segment region in place of a two-segment region.

Therefore, if the Line-Line regions can be classified as a single line, with the break point removed, that break point in fact is removed. If the regions identified as a line leading into an arc or circle, or an arc or circle leading into a line, with a pre-qualification standard, can be classified, with the break point removed, as a single arc or single circle, that break point is removed. The pre-qualification is that the ratio of the radius for the arc or circle region to the length of the line region should be greater than or equal to a certain minimum value, for this break point elimination to be considered. The reason for this is that, to some degree, relatively short lines leading into or off of an arc or circle should be permitted and not eliminated. Such a minimum value of three has been found convenient and effective. With regard to the candidate break point at the union of an arc or circle segment with another arc or circle segment, if, with the break point removed, the segment classification procedure for single segments will yield a single arc or single circle, that candidate break point is then removed.

Now turning to the flow chart of FIG. 4, the operations there are directed to the recognition of the individual segments into which a stroke has been divided, or the recognition of the single segment if there are no divisions, and the creation of a point, straight line, arc or ellipse based on what occurs.

The initial aspect of this can be conveniently referred to as the transforming/normalizing of the stream of x, y coordinates. As already indicated, although some "clean-up" changes may have been made in relation to the point stream in connection with the break determination aspect already addressed, here the stream of points is the stream of locations represented by the initial indicator elements which were generated in the computer as the immediate result of the movement of the mouse by the user (e.g., see FIG. 6). The exception is the elimination of points, and their indicator elements, that were removed candidate break points as just described. Also, as in break recognition, duplicate points are eliminated here.

As a technical matter, it might be noted that the "fineness" or accuracy of designated locations, represented in the computer apparatus, in fact is limited by the characteristics of the workstation 30 (FIG. 1). In that regard, it should be noted that a display (such as the display 36 in FIG. 1), and its interfacing components may well have a "fineness" or resolution capability which in fact is less than that of the part of the work station which receives input information, does calculations, and stores results. Therefore, the location information in the information elements may typically have a much higher degree of resolution than what is displayed on a display screen or in other types of display, such as a print-out.

Returning to FIG. 4, as will become apparent from the description of the initial transforming/normalizing set of operations related to a segment, this set of operations will typically involve the rotating, scaling and translating of the points (locations represented by the indicator elements) for the segment under consideration, or the interruption of these operations while in process to reach a pre-classification of the segment as a point (Block 186 in FIG. 4).

At the outset of this, a Closed flag, which is used to record whether a segment has been determined to be a closed segment (such as a circle or ellipse), or an open segment (such as an arc or straight line), is set to False. Then the set of points is operated on to rotate the stream such that the vector defined by the start and end points is along the X-axis (at zero degrees). Then the dimensions of the resulting segment, in the X-direction ("dx") and in the Y-direction ("dy"), are determined. And the distance between the start point and the end point is also calculated.

The ratio of this distance to the diagonal for a minimum-maximum box ("min-max box") for the rotated segment, with the sides of the box parallel to the X-axis and Y-axis, is tested. This diagonal, of course, is the square root of $((dx)^2+(dy)^2)$. If this tested ratio is below a certain threshold, then certain additional operations are performed. As for this threshold, it has been found advantageous to allow the user some freedom in selecting it. A threshold of 0.1 which might be used by a user considered an "expert" in making relatively accurate drawings, a threshold of 0.2 for a user considered "intermediate", and a threshold of 0.3 for a user considered a "beginner" have been found convenient and efficient.

If the ratio is below the threshold, then the least square fit line for all the points of the segment is calculated, the stream of points is rotated such that this line is at zero degrees, and the Closed flag is set to True, to indicate that, at this point, the segment has been determined to be closed. The least square fit line, of course, is the line which minimizes the square root of the sum of the distances squared, between certain related points of the segment and line. Such a least square fit line, and its determination by regression analysis is well understood and commonly used in various mathematically oriented operations and disciplines.

Independently of whether the ratio was below the indicated threshold, and of whether the operations dependent on such are carried out, there has been a rotation of the point stream—either such that the vector defined by the start and end points is along the X-axis (zero degrees), or such that the least square fit line is along the X-axis. In either case, the rotated segment is then scaled and translated to lie within an area of a predetermined size in the +X, +Y quadrant, which is located at the origin) (0,0). As an example, a grid size of one inch by one inch has been found convenient and efficient.

In a qualification to what has just been described, if the dimensions of the segment, represented by (dx, dy) are sufficiently small, or stated another way, the min-max box within which the segment fits, is sufficiently small, the segment can be pre-classified as a point (Block 186), and a number of operations (Part of Block 186, and Blocks 190, 192, 194, 196 and 200) can be avoided. Of course, there may be a significant number of indicator information elements within this area, i.e., the user may have moved the mouse somewhat to indicate the point, but the determination has been made that what the user has done should be interpreted as a point.

In fact, and as may be expected, it has been found convenient and efficient to allow point classifications only where a full stroke can initially be pre-classified as a point. Therefore, prior to the break recognition aspects, as addressed in FIGS. 2 and 3, it is convenient and efficient to test a stroke for segment pre-classification as a point in the manner just described (including with the elimination of duplicate points as under the break recognition operations). In accordance with this, the point pre-classification, and the point creation and related aspects (removal of created point) as explained below, of the operations of FIG. 4, need not be undertaken for segment recognition for a multi-segment stroke, but only in segment classification operations prior to break recognition. And if there is such a point pre-classification prior to break recognition, the point segment is created at that time, in the manner explained below without break recognition.

The next set of operations can be conveniently referred to as creating an input pattern for the segment, for purposes of pattern recognition and/or for a neural net.

For purposes of testing the information about the segment for classification purposes, the result of the rotated, scaled and translated stream of locations (points) which form the segment, is mapped into a grid of 100 locations, 10 locations by 10 locations (Block 190). This, of course, is to limit the input information for classification of the segment to a relatively manageable size. Thus, the input information is reduced down to information as to whether each of 100 locations is a "hit" or "miss" for that segment.

In order to reduce the similarity of hit patterns for this ten-by-ten matrix, it is advantageous to purposely modify certain types of patterns in order to make them more distinct from certain other types of patterns.

In accordance with this, if the segment has been recorded as Closed, the pattern of "hits" is translated to the top part of the grid (Block 192). An example of this is the translation represented immediately below, with the hits in the ten-by-ten grid represented by x's.

```
. . . . . . . . . .      . . x x x x x x . .
. . . . . . . . . .      . x . . . . . . x .
. . . . . . . . . .      x . . . . . . . . x
. . . . . . . . . .      . x . . . . . . x .
. . . . . . . . . .      . . x x x x x x . .
. . x x x x x x . .  ⟶   . . . . . . . . . .
. x . . . . . . x .      . . . . . . . . . .
x . . . . . . . . x      . . . . . . . . . .
. x . . . . . . x .      . . . . . . . . . .
. . x x x x x x . .      . . . . . . . . . .
```

As indicated, this translation involved translating the hit pattern upward until a hit reaches the top row of the grid.

Another such change, in order to simplify the process of distinguishing between different classes of segments, is to flip the hit patterns for segment patterns which appear to be indicative of "smiling" arcs to make the patterns "frowning" arcs. The goal is to make the arc patterns all "frowning" to facilitate their recognition. An example of this, analogous to the translation example represented above, is represented as follows:

```
. . . . . . . . . .      . . . . . . . . . .
. . . . . . . . . .      . . . . . . . . . .
. . . . . . . . . .      . . . . . . . . . .
. . . . . . . . . .      . . . . . . . . . .
. . . . . . . . . .  ⟶   . . . . . . . . . .
. . . . . . . . . .      . . . . . . . . . .
x . . . . . . . . x      . . . x x x x . . .
. x . . . . . . x .      . . x . . . . x . .
. . x . . . . x . .      . x . . . . . . x .
. . . x x x x . . .      x . . . . . . . . x
```

Thus, if the start and end of the hit pattern for the segment are on the same row of the grid, and the start-end row is not on the first row, and also if there are not any hits above this start-end row, the pattern is flipped. More technically, this involves changing the pattern to a mirror image across the horizontal which bisects the pattern in the Y direction. (This is also indicated at Block 192 in FIG. 4.)

With this accomplished, an attempt can then be made to do another pre-classification of the segment, through its grid pattern, as a line, a 45-degree arc, or as an areafill symbol using pattern recognition operations (Block 194). The reason for this is that the grid patterns for these segment classifications can be readily recognized by "inspection". Specifically, a pattern to be classified as a straight line, should only have hits along the first grid row; a segment to be classified as a 45-degree arc should only have hits in the first two rows of the grid, and an areafill "segment" should only have hits which fall along the top row of the grid pattern. Such patterns are represented below:

```
. . . . . . . . . .
. . . . . . . . . .
. . . . . . . . . .
. . . . . . . . . .
. . . . . . . . . .
. . . . . . . . . .
. . . . . . . . . .
. . . . . . . . . .
. . . . . . . . . .
x x x x x x x x x x
```

Line

```
. . . . . . . . . .
. . . . . . . . . .
. . . . . . . . . .
. . . . . . . . . .
. . . . . . . . . .
. . . . . . . . . .
. . . . . . . . . .
. . . . . . . . . .
. . x x x x x x . .
x x . . . . . . x x
```

45-Degree Arc

```
x x x x x x x x x x
. . . . . . . . . .
. . . . . . . . . .
. . . . . . . . . .
. . . . . . . . . .
. . . . . . . . . .
. . . . . . . . . .
. . . . . . . . . .
. . . . . . . . . .
. . . . . . . . . .
```

Areafill

With regard to the areafill, it should be noted that such an areafill symbol should have been translated to the indicated top row due to its classification as a Closed segment. The distinction between the areafill and the straight line in what is shown above is indicative if how the translation and flipping of patterns operates to help in easily distinguishing between different segment classifications.

Somewhat similar to the situation of point pre-classification, an areafill symbol in fact is not allowed as a multi-segment stroke. For these reasons, and other reasons of efficiency, if in the testing for a point pre-classification prior to break recognition, there is no point pre-classification, the operations in the parts of FIG. 4 leading to pre-classification as a line, 45° arc or areafill, the creation of a line, arc or areafill based on such pre-classification, and related aspects (removal of created segment), are also carried out prior to break recognition operation. This both permits testing of a stroke as a "single segment" areafill symbol, and can add efficiency in the instance of other forms of pre-classification. However, contrary to the situation for pre-classification as a point, in multi-segment recognition for a stroke, these pre-classification and related aspects for a line and 45° arc, of course, are also still carried out for multi-segment strokes after break recognition. In multi-segment recognition for a stroke, as previously indicated, such pre-classification and related aspects for an areafill symbol, however, would not be carried out.

At this juncture, a pre-classification for any segment which is to be classified as a point, a straight line, a 45-degree arc or an areafill symbol should have been accomplished (the point and areafill aspect only applicable to segment recognition attempted for a complete stroke prior to break recognition). However, if there has been no such pre-classification, one would now be dealing with a segment after break recognition in accordance with FIGS. 2 and 3, and the question remains as to whether the segment is to be classified as an arc, a circle, an ellipse or a delete symbol. In order to accomplish this classification aspect, a neural net is used employing the 100 points of the grid as the input nodes (Block 196).

The neural net is one developed according to standard and well known techniques which have been used for a number of years. It is a back propagation neural net, as indicated, having the one hundred grid locations as one hundred input nodes, having 12 hidden nodes, and six output nodes. The output nodes represent, according to the strength of the output at the particular node, a confidence level in terms of the relative "closeness", by comparison with the other five possibilities, of the grid pattern to that for a 90-degree arc, a 180-degree arc, a 270-degree arc, a circle, an ellipse, or a delete symbol. With reference to the selection of the alternative arc sizes for the output nodes, these alternatives are chosen with a view ultimately of not distinguishing, for a segment, between arcs of different sizes, but for distinguishing an arc, from a circle, an ellipse, or a delete symbol. An example of output percentages which might be represented by the output levels at the nodes of the neural net, is as follows: 90-degree arc—92%; 180-degree arc—20%; 270-degree arc—1%; circle—0%; ellipse—2%; delete—8%.

Once the test results of the neural net exist, certain criteria must be met in order to achieve a classification (as opposed to a situation in which a determination is made and indicated that no classification for the segment can be achieved). As a general criterion, the top two classification candidates must have a combined percentage level of 50% or more. Then the following classification criteria are applicable to the 90-degree arc classification:

1. Closed flag must be False. (The closed or open indicator, thus indicating an open segment).
2. The percentage indicated for the 90-degree arc must be 80% or more, or the runner-up must be the 180-degree arc.

Then the criteria applicable to classification as a 180-degree arc are as follows:

1. Closed flag must be False.
2. Percentage level must be 80% or more, or the runner-up must be the 90-degree or 270-degree arc.

For the 270-degree arc classification, the additional criteria are:

1. Percentage level must be 80% or more, or the runner-up must be the 180-degree arc or the circle.
2. If the percentage level is less than 80% and the runner-up is the 180-degree arc, the Closed flag must be False.

And the classification criterion for a circle, is the following:

1. Percentage level must be 80% or more, or runner-up must be 270-degree arc or ellipse.

The classification criteria applicable to an ellipse are then the following:

1. Closed flag must be True.
2. Percentage level must be 80% or more, or runner-up must be a circle.

Finally, the classification criteria applicable to the delete symbol are the following:

1. Closed flag must be False.
2. Percentage level must be 80% or more.
3. There must be at least 15 points in the delete stroke (with the duplicate points eliminated).

An additional operation applicable to the classification using the neural net permits a change in the classification as determined above from circle to ellipse or from ellipse to circle if the aspect ratio for the segment indicates this should be done (Block 200). Specifically, if a determination indicative of an aspect ratio is beyond a pre-determined limit, a circle classification will be changed to an ellipse classification. Alternatively, if the determination is less, an ellipse classification will be changed to a circle classification. It has been found convenient and efficient to have the user set this limit at 2.5 if the user is considered a beginner, at 2.0 if the user is considered intermediate, and at 1.5, if the user is considered expert, in executing drawings. The calculation can conveniently be the ratio of the larger of the difference in the X or Y values divided by the smaller of the difference in the X or Y values for the segment as rotated in the manner described above—the larger of this "dx" and "dy" divided by the smaller of the two. As described above, this rotation would be expected to be based on the least square fit line for a circle or ellipse. Of course, a calculation based on other "versions" of the stroke, indicative of an aspect ratio could, alternatively be employed, such as based on "dx" and "dy" values for the segment as represented on the ten by ten grid.

Now, the segment of concern has been placed in the classification of a point, in one sort of pre-classification (Block 186), in the classification of a straight line, 45-degree arc or an areafill symbol, by pattern recognition, in another type of pre-classification procedure (Block 194), or placed in the classification of a 90-degree arc, a 180-degree arc, a 270-degree arc, a circle, an ellipse or a delete symbol, using a third sort of classification procedure including the use of a neural net (Blocks 196 and 200). From this point, the information to actually create or define the segment in the computer apparatus can be undertaken (Block 202), with the qualification that such a segment can still be removed if it is tested and found to have a geometry which is extremely large or small, or a geometry which is very far from the origin (Block 204). As previously indicated, this could be occurring, based on pre-classification as a point, for a stroke prior to break recognition. It could be occurring for a line or 45° arc for a stroke prior to break recognition, or in segment recognition after break recognition. And for other arcs, an ellipse or a circle, this could be occurring after break recognition.

Referring to this, it is convenient to refer to an arc first. In that regard, the method herein creates arcs which are each limited to a part of a single circle—i.e., a circle having a single centerpoint and radius. Once the classification has been set as an arc, the degree-size classification that has been made is no longer of direct concern. The initial indicator information elements stored in the computer apparatus (the points they represent) are now used again, with duplicate points removed and with removed candidate break points also not present. Specifically, the location information for the first such recorded indicator information element is used as a first sample point for defining the circle used in creating the arc; the location information for the last such recorded element is used as a second sample point; and the location information for the information element which is at a number count half-way (or approximately half-way) between the first and the last, is used as a third sample point. Specifically, those three points define a centerpoint and a radius for the circle. And the extent of the arc is defined by the first point location and the last point location (Block 202).

One pre-condition for the creation of the arc is that the three sample locations cannot be co-linear nor can any two of the three be coincident. Another, in the nature of post-condition, is that if the arc created is greater than 330 degrees, the arc simply is closed to make a complete circle (Block 202).

With regard to the removal of a created arc (Block 204), there is a removal condition based on the geometry being too far from the origin. Specifically, it has been found convenient and efficient to allow the user to specify a scale for a "model unit" such that one such model unit equals one inch (on a display), or such that 25.4 model units equals one such inch (in the sense that there are approximately 25.4 millimeters in an inch). Once this scale is determined by the user, if the centerpoint for the created arc is determined to be outside the area of 15,000 by 15,000 model units, it has been found convenient and efficient to not maintain the created arc, but to remove it and regard it simply as an error condition.

Additional such error conditions, for an arc, relate to what may be termed a distance tolerance. Specifically, if the distance between the endpoints of the arc, or if the radius for the arc, is less than a distance tolerance, i.e., "too small", an error condition similarly is deemed to exist (Block 204). It has been found convenient and efficient to permit the user to specify this distance tolerance based on whether the user is considered a beginner, an intermediate or an expert in executing drawings. Such a distance tolerance of 0.1, 0.2 and 0.3 model unit has been found convenient and effective for, respectively, the expert level, the intermediate level and the beginner level.

Turning to the creation of a straight line, in this instance, the locations for the first and last indicator information elements (with duplicate points removed and with removed candidate break points not present) provide the sample points for creating the straight line. However, as a pre-condition to such creation, these two locations cannot be coincident. If they are, an error condition is determined to exist. Also, as post-conditions (Block 204), if either location is outside a 20,000 by 20,000 model unit area, there is an error condition; and there is also an error condition if the length of the resulting line is less than the distance tolerance, i.e., "too small".

Turning to the creation of a circle as a segment, a min-max box, of the type previously described (Block 202), is determined. The "centerpoint" (based on bisecting the sides of the box) for the box is selected as the centerpoint for the circle. And the average of the width and length dimensions of the box is selected as the diameter for the circle. With regard to the removal of the created circle based on extremely large or small geometry or geometry very far from the origin (Block 204), it has been found convenient and efficient to require the radius to be greater than or equal to the distance tolerance and less than 5,000 model units. Similarly, it has been found advantageous to require the centerpoint to be within an area of 20,000 by 20,000 model units.

Turning to the creation of a point as the segment, the location specified by the initial indicator information element (with duplicate points removed, as in break recognition) is selected as the location for the created point. As previously indicated, there would typically be a number of information elements after the first one, with the point determination based on the minimal size of the dimensions for the stroke. For a point, there is a removal of the created point, and an error condition, if the selected point is outside an area of 20,000 by 20,000 model units (Block 204).

For the creation of an ellipse (Box 202), a min-max box, of the type previously described, is used in determining the centerpoint and the lengths for the major and minor axes. The centerpoint for the ellipse is the "centerpoint" for this box determined by the intersection of the lines bisecting the opposing sides, and the lengths of the major and minor axes are determined by the length and width of the box. To determine the angle for the ellipse, the angle of a least square fit line, of the type previously described, is used. It has been found convenient and effective not to adopt removal conditions for the created ellipse (Block 204).

As previously indicated, points, deletes and areafills are single element strokes. An areafill is associated with a closed area (FIG. 9). The angle of the cross-hatching which results from an areafill can be determined by the angle for a least square fit line for the symbol. It has been found convenient and effective to select an angle which is closest to the angle of the least square fit line from among the following group: 0°, 30°, 45°, 60°, 90°, 120°, 135°, 150°, 180°, 210°, 225°, 240°, 270°, 300°, 315° and 330°. One readily apparent choice for associating the areafill with a selected closed area is the proximity of the location for the first indicator element (with duplicate points removed, as in break recognition) in the areafill symbol, to the closed area.

For a delete symbol, one readily apparent alternative is to delete the last prior segment (or stroke) added by the user, with the qualification that a point is to be deleted before a non-point. Another alternative is to use proximity, e.g., proximity to the first indicator element (with duplicate points removed, as in break recognition) for the delete symbol, or to use proximity first, and the last prior segment alternative, only as a fallback.

In FIG. 5, the aspects directed to the determination of breaks for a stroke in order to divide the stroke into segments, the recognition and creation of segments, and to the matter of constraints, are placed in their broader computer-aided design (CAD) context. Of course, the initial operations to which the figure is directed, are in accordance with what has been described in detail, including: a user drawing a stroke, with the indicator moved in a stroke (Block 206); the selection of the break locations (points), dividing a multi-segment stroke into separate segment regions (Block 210); the recognition of the multiple segments in the stroke (or, e.g., of the segment in a single-segment stroke) (Block 212); and the creation of the multiple segments (or, e.g., single segment) (Block 214).

With the creation of these segments (of the information which defines these segments), the segments (information) can be added to the CAD model which is developed at the workstation (Block 214). Such a model, which is a standard in the CAD field, contains the information to define the design or work which is of concern.

FIGS. 16 and 20, and the description in connection with such figures, illustrate the finding of constraints within the segments of a stroke. FIGS. 17, 18 and 19, and the description in connection with them, illustrate the finding and taking account of constraints between the segments of different strokes, i.e., of a newly generated stroke with the segments of a prior stroke or strokes. Such operations, of course, incorporate the finding of constraints, such as coincidence, parallelism, tangency and relimitation, within the created segments for a stroke, between such segments and those of prior strokes (Block 216), and the adding of the found constraints and the created segments to a constraint management system (Block 218) for the CAD system. Operations and techniques to find and determine such geometrical constraints in an CAD environment are the subject of an application by the present assignee, filed concurrently herewith, having Edward T. Corn as the inventor. That application, which is incorporated herein by reference, is entitled Automatic Identification of Geometric Relationships Between Elements of a Computer-Generated Drawing and carries Robbins, Berliner & Carson Docket No. 5908-102. Beyond operations and techniques relating to geometrical constraints just noted, that application is also directed to additional constraints, such as colinearity, perpendicularity, and same size.

The constraint management system can then solve what the segments should be, consistent with the constraints (Block 220). Of course, this could typically include modifying the created segments somewhat in order to incorporate such consistency, and, also, modifying prior segments for the same reason. Once constraints are determined, the solving of segments consistent with such constraints is a more standard type of operation. A product sold by D-Cubed Ltd. under the name DCM is illustrative of programming/software for a workstation adapted to carry out such operations.

Once segments are solved consistent with geometrical constraints, the segment information, as stored in the CAD model, can then be updated for the segments (Block 222). Then the model is up-to-date for any of its normal design or display functions, including the display of the updated segments (Block 224).

The distance from the centerpoint for a constructed curvature circle applicable to an information element (or the location or point represented thereby), from a preceding information element is indicated as calculated in the preceding description (Block 154). Although not incorporated in the break aspects as previously described, modifications could be incorporated to use these center distances and to incorporate the use of inflection breaks, in addition to corner and fillet breaks. To do this, locations might be found that have relatively large values for this applicable center distance, as candidates for inflection breaks. These locations, as a prerequisite, should also be in a relatively small series of composite Line classifications, bracketed, on both sides, by fairly long series of curved composite classifications. An example of this could be:

| Composite Classifications | Center Distance |
|---|---|
| Curve | .1 |
| Curve | .2 |
| ... | ... |
| ... | ... |
| Curve | .1 |
| Curve | .1 |
| Line | 100. |
| Line | 50. |

-continued

| Composite Classifications | Center Distance |
|---|---|
| Curve | .2 |
| Curve | .1 |
| ... | ... |
| ... | ... |
| Curve | .1 |

In this example, the inflection break or inflection break candidate would then typically be where the value 100 center distance occurs.

Along similar lines, a variation on the steps to identify break point candidates, as outlined in connection with FIG. 3, may be considered advantageous in certain respects. Referring to this alternative, and again assuming that all points are not curved (in the manner previously described), at this juncture, which would avoid any break point identification, re-categorization operations can then begin under this alternative. And, again, here, one form of potential re-categorization, relates to Sharp Turn regions. Repeating the prior example, an example of such a region would be a series of composite classifications for a series of points as follows: Line, Line, Curve, Curve, Curve, Sharp Turn, Sharp Turn, Sharp Turn, Curve, Curve, Curve, Line, Line. But, in this case, the classifications for the Sharp Turn points are converted to Curve classifications, so the series would be: Line, Line, Curve, Curve, Curve, Curve, Curve, Curve, Curve, Curve, Curve, Line, Line.

And, again, here, although in the specific example, there are three consecutive points that are Sharp Turn, a single Sharp Turn point is sufficient to set in motion the Sharp Turn point re-categorization.

The re-categorization of a substantial number of consecutive points having a change in angle less than some minimum, to Line, and the re-categorization of Mixed Curve points also having a small change in angle, to Line, is then still performed.

Then, for each former Sharp Turn, converted as above, the points that are now Curve points are considered together and the point among those having the highest absolute change in angle value is found. That point, then, is set up as a candidate corner break point.

Then for the candidate fillet break points, their selection, based on Curve regions having sufficient Curve point counts, and having bracketing Line points (including regions having re-categorized Sharp Turn points), is as previously described. And, the potential selection of additional corner break points, if the number of points in the Curve region is insufficient, but sufficient for a candidate corner break point is as previously described.

This, by contrast with the other approach, does not tend to wash out some potential candidate fillet breaks with corner breaks. It, however, also can typically create more candidate break points that are removed in the manner previously described to determine the final break points.

It might be noted that although a mouse 32 has been shown and described herein as a convenient device for a user to employ in the interactions described, and particularly in indicating a user-controlled path, a variety of other conventional alternatives are readily available. One of these, of course, is a puck which is part of a digitizing tablet device.

Many of the details included above, and how they are carried out, are particularly well suited to incorporation into CAD systems of Dassault Systemes of America Corp., which are marketed under the trademark PROFESSIONAL CADAM, for Unix Workstations of IBM sold under the model name RS-6000 or sold by Hewlett-Packard Company under the model number 700, and the operations are particularly well suited to implementation through the C++ language, or that language in combination with the C and Fortran languages.

As will be readily apparent, various aspects, as described in detail herein, are exemplary, and readily subject to different choices and to change or modification, depending on the particular application, context, and requirements. Thus, many changes and variations may be made without departing from the scope or spirit of the invention.

What is claimed is:

1. A computerized method for processing a drawing path from a sketch, said method comprising:
   receiving a point stream representing the drawing path;
   resolving the point stream into first and second segments based on at least one geometrical characteristic, each segment having a plurality of constituent points from the point stream;
   classifying each of the first and second segments into one of a plurality of groups of geometric elements using a predetermined limit value;
   identifying a geometric constraint between the first and second segments based on a classification of the first and second segments into the plurality of groups of geometric elements; and
   repositioning the constituent points of the first segment relative to the constituent points of the second segment based upon the geometric constraint.

2. The method of claim 1 wherein repositioning includes making the first segment parallel to the second segment based upon a parallelism constraint.

3. The method of claim 2 wherein identifying a geometric constraint includes identifying the parallelism constraint between the first and second segments based upon a classification of the first and second segments into a line geometric element group.

4. The method of claim 1 wherein repositioning includes terminating the first and second segments at a common point based upon a relimitation constraint.

5. The method of claim 1 wherein repositioning includes making the first segment tangent to the second segment based upon a tangency constraint.

6. A computerized method for processing a freehand sketch, said method comprising:
   receiving a point stream representing freehand movement by a computer-user;
   resolving the point stream into one or more segments based on at least one geometrical characteristic;
   classifying each of the one and more segments with a neural network as a line, arc or circle, using a predetermined limit value; and
   generating a representation of the one or more segments based on a classification of each of the one or more segments as a line, arc or circle.

7. The method of claim 6 wherein generating a representation of the one or more segments based on a classification comprises generating a representation of each of the one or more segments substantially satisfying the geometric characteristics of a line, arc or circle.

8. The method of claim 6 wherein resolving the point stream into one or more segments comprises:
   identifying a breakpoint in the point stream; and
   resolving the point stream into two segments based on the breakpoint.

9. The method of claim 8 wherein identifying a breakpoint in the point stream comprises:
   determining angles defined by sequences of points in the point stream; and
   identifying the breakpoint based on the angles.

10. The method of claim 6 wherein classifying each of the one or more segments comprises mapping a first segment of the one or more segments into a grid.

11. The method of claim 10 wherein classifying each of the one or more segments with a neural network further comprises the steps of:
    processing the first segment mapped into the grid with the neural network; and
    the neural network outputting a plurality of values indicating a likelihood that the first segment is a line, arc or circle.

12. The method of claim 10 wherein mapping a first segment into a grid comprises rotating the first segment.

13. The method of claim 10 wherein mapping a first segment into a grid comprises scaling the first segment.

14. The method of claim 10 further comprises determining whether the one or more segments are open segments or closed segments and wherein mapping a first segment of the one or more segments into a grid comprises mapping the first segment in a first section of the grid if the first segment is an open segment and mapping the first segment in a second section of the grid if the first segment is a closed segment.

15. The method of claim 6 wherein classifying each of the one or more segments comprises classifying each of the one or more segments as a point, line, arc, circle, ellipse, area fill symbol or delete symbol.

16. The method of claim 6 further comprising:
    generating dimensional information based on the point stream; and
    displaying the dimensional information with the representation of the one or more segments.

17. A computer system for processing a drawing path from a sketch, said computer system comprising:
    a processor;
    a user input device;
    a display device; and
    a memory coupled to said processor, said memory having stored therein sequences of instructions which, when executed by said processor, cause said processor to perform the steps of:
    receiving a point stream representing the drawing path lacking in certain precision criteria, the point stream representing input from said user input device;
    resolving the point stream into first and second segments based on at least one geometrical characteristic, each segment having a plurality of constituent points from the point stream;
    classifying each of the first and second segments into one of a plurality of groups of geometric elements using a predetermined limit value;
    identifying a geometric constraint between the first and second segments based on a classification of the first and second segments into a plurality of groups of geometric elements; and
    displaying the first and second segments on said display device, the constituent points of the first segment being repositioned relative to the constituent points of second segment based upon the geometric constraint.

18. A computer system for processing a freehand sketch, said computer system comprising:

a processor;

a user input device;

a display device; and a memory coupled to said processor, said memory having stored therein sequences of instruction which, when executed by said processor, cause said processor to perform:

receiving a point stream based on input from said user-input, the point stream representing freehand movement by a user of said computer system;

resolving the point stream into one or more segments based on at least one geometric characteristic;

classifying each of the one or more segments with a neural network as a line, arc or circle, using a predetermined limit value, and displaying on said display device a representation of the one or more segments based on a classification of each of the one or more segments as a line, arc or circle.

19. The computer system of claim 18 wherein the sequences of instructions which, when executed by said processor, cause said processor to perform classifying each of the one or more segments comprise instructions which, when executed by said processor, cause said processor to perform mapping a first segment of the one or more segments into a grid.

20. The computer system of claim 19 wherein the sequence of instructions which, when executed by said processor, cause said processor to perform classifying each of the one or more segments with a neural network further cause said processor to perform:

inputting values from the grid, including values representing the first segment mapped therein, into the neural network; and reading a plurality of values output by the neural network, each value indicating the likelihood that the first segment is a line, arc or circle.

21. Computer-readable media having stored thereon a plurality of sequences of instructions, said plurality of sequences of instructions including sequences of instructions which, when executed by a processor, cause said processor to process a drawing path from a sketch by:

receiving a point stream representing the drawing path lacking in certain precision criteria;

resolving the point stream into first and second segments based on at least one geometrical characteristic, each segment having a plurality of constituent points from the point stream;

classifying each of the first and second segments into one of a plurality of groups of geometric elements using a predetermined limit value;

identifying a geometric constraint between the first and second segments based on a classification of the first and second segments into the plurality of groups of geometric elements; and repositioning the constituent points of the first segment relative to the constituent points of the second segment based upon the geometric constraint.

* * * * *